United States Patent
Stone et al.

(10) Patent No.: US 8,540,153 B2
(45) Date of Patent: Sep. 24, 2013

(54) SYSTEMS, METHODS AND COMPUTER PROGRAM PRODUCTS FOR IMPLEMENTING PROCESSES RELATING TO RETAIL SALES

(75) Inventors: Steven M. Stone, Lewisville, NC (US); Santosh E Bhasker, Advance, NC (US); Alex C Panzano, Winston-Salem, NC (US); John P Mitchell, N. Wilkesboro, NC (US)

(73) Assignee: Lowe's Companies, Inc., Mooresville, NC (US)

( * ) Notice: Subject to any disclaimer, the term of this patent is extended or adjusted under 35 U.S.C. 154(b) by 0 days.

(21) Appl. No.: 12/930,008

(22) Filed: Dec. 24, 2010

(65) Prior Publication Data

US 2011/0166909 A1 Jul. 7, 2011

Related U.S. Application Data

(63) Continuation of application No. 10/796,485, filed on Mar. 9, 2004, now Pat. No. 7,909,241.

(51) Int. Cl.
*G06K 15/00* (2006.01)
*G06Q 30/00* (2012.01)

(52) U.S. Cl.
USPC .......................... 235/383; 705/26.64; 715/212

(58) Field of Classification Search
USPC .................. 705/7.25, 7.31, 7.32, 26.1, 26.5, 705/26.8, 28, 7.21, 26.43, 26.61, 26.64, 26.7, 705/26.81; 235/376, 383, 375, 385; 706/47; 709/203, 217; 715/202
See application file for complete search history.

(56) References Cited

U.S. PATENT DOCUMENTS

| 3,846,702 | A | 11/1974 | Dziki et al. |
| 4,019,027 | A | 4/1977 | Kelley |
| 4,578,768 | A | 3/1986 | Racine |
| 4,700,318 | A | 10/1987 | Ockman |
| 4,775,935 | A | 10/1988 | Yourick |

(Continued)

FOREIGN PATENT DOCUMENTS

| TW | 569116 | 1/2004 |
| WO | WO00/03329 | 1/2000 |

(Continued)

OTHER PUBLICATIONS

Taiwan Search Report for Design Application 094107157, dated Jan. 9, 2009.

(Continued)

*Primary Examiner* — Andrew Joseph Rudy
(74) *Attorney, Agent, or Firm* — W. Kevin Ransom; Moore & Van Allen PLLC

(57) ABSTRACT

The present invention provides a system that facilitates the selection of purchasable items for use in an environs defined by the customer. In one aspect, the system includes a processing element capable of proposing a plurality of purchasable items to the customer for selection by the customer. The processing element also is capable of receiving data representing the environs and data representing at least one purchasable item selected by the customer. The processing element is further capable of generating and displaying a three-dimensional graphical representation of the environs and each purchasable item or items selected by the customer so that the customer can visualize the items in the environs.

33 Claims, 5 Drawing Sheets
(1 of 5 Drawing Sheet(s) Filed in Color)

(56) References Cited

U.S. PATENT DOCUMENTS

| | | | |
|---|---|---|---|
| 4,782,448 A | 11/1988 | Milstein | |
| 4,852,001 A | 7/1989 | Tsushima et al. | |
| 4,989,141 A | 1/1991 | Lyons et al. | |
| 4,992,940 A | 2/1991 | Dworkin | |
| 5,111,391 A | 5/1992 | Fields et al. | |
| 5,146,548 A | 9/1992 | Bijnagte | |
| 5,189,606 A | 2/1993 | Burns et al. | |
| 5,233,533 A | 8/1993 | Edstrom et al. | |
| 5,235,680 A | 8/1993 | Bijnagte | |
| 5,270,920 A | 12/1993 | Pearse et al. | |
| 5,276,805 A | 1/1994 | Hamaguchi | |
| 5,493,490 A | 2/1996 | Johnson | |
| 5,596,502 A | 1/1997 | Koski et al. | |
| 5,615,342 A | 3/1997 | Johnson | |
| 5,687,322 A * | 11/1997 | Deaton et al. | 705/14.25 |
| 5,709,410 A | 1/1998 | Reeves, Jr. | |
| 5,825,365 A | 10/1998 | Hirota et al. | |
| 5,836,312 A | 11/1998 | Moore | |
| 5,847,971 A | 12/1998 | Ladner et al. | |
| 5,870,771 A * | 2/1999 | Oberg | 715/202 |
| 5,881,283 A | 3/1999 | Hondou et al. | |
| 5,918,219 A | 6/1999 | Isherwood | |
| 5,950,374 A | 9/1999 | Gromat | |
| 5,956,693 A * | 9/1999 | Geerlings | 705/14.53 |
| 5,966,695 A | 10/1999 | Melchione et al. | |
| 5,970,469 A * | 10/1999 | Scroggie et al. | 705/14.26 |
| 5,974,400 A | 10/1999 | Kagami et al. | |
| 5,999,908 A * | 12/1999 | Abelow | 705/7.32 |
| 6,000,855 A | 12/1999 | Miyazaki | |
| 6,002,853 A | 12/1999 | de Hond | |
| 6,055,573 A * | 4/2000 | Gardenswartz et al. | 709/224 |
| 6,061,658 A * | 5/2000 | Chou et al. | 705/7.33 |
| 6,067,525 A | 5/2000 | Johnson et al. | |
| 6,070,147 A * | 5/2000 | Harms et al. | 705/14.25 |
| 6,078,892 A * | 6/2000 | Anderson et al. | 705/7.33 |
| 6,169,992 B1 | 1/2001 | Beall et al. | |
| 6,223,983 B1 * | 5/2001 | Kjonaas et al. | 235/379 |
| 6,298,348 B1 * | 10/2001 | Eldering | 705/36 R |
| 6,459,435 B1 | 10/2002 | Eichel | |
| 6,460,036 B1 | 10/2002 | Herz | |
| 6,519,608 B1 | 2/2003 | Andersen et al. | |
| 6,519,763 B1 | 2/2003 | Kaufer et al. | |
| 6,572,377 B2 | 6/2003 | Masters | |
| 6,581,092 B1 | 6/2003 | Motoyama et al. | |
| 6,665,577 B2 | 12/2003 | Onyshkevych et al. | |
| 6,693,236 B1 * | 2/2004 | Gould et al. | 84/477 R |
| 6,725,287 B1 * | 4/2004 | Loeb et al. | 710/8 |
| 6,741,728 B1 | 5/2004 | Genest | |
| 6,745,172 B1 * | 6/2004 | Mancisidor et al. | 706/60 |
| 6,799,150 B2 | 9/2004 | Hamilton et al. | |
| 6,810,300 B1 | 10/2004 | Woltman et al. | |
| 6,879,960 B2 * | 4/2005 | Nascenzi et al. | 705/14.4 |
| 6,901,380 B1 | 5/2005 | Bremers | |
| 6,912,505 B2 | 6/2005 | Linden et al. | |
| 6,917,922 B1 | 7/2005 | Bezos et al. | |
| 6,985,876 B1 | 1/2006 | Lee | |
| 6,988,077 B1 * | 1/2006 | Walker et al. | 705/14.35 |
| 7,047,092 B2 | 5/2006 | Wimsatt | |
| 7,062,722 B1 | 6/2006 | Carlin et al. | |
| 7,080,096 B1 | 7/2006 | Imamura | |
| 7,099,734 B2 | 8/2006 | Pieper et al. | |
| 7,110,983 B2 | 9/2006 | Shear et al. | |
| 7,124,096 B2 * | 10/2006 | Dutta et al. | 705/26.61 |
| 7,168,051 B2 | 1/2007 | Robinson et al. | |
| 7,174,174 B2 | 2/2007 | Boris et al. | |
| 7,195,157 B2 * | 3/2007 | Swartz et al. | 235/383 |
| 7,228,289 B2 | 6/2007 | Brumfield et al. | |
| 7,269,573 B1 | 9/2007 | Bunn et al. | |
| 7,277,572 B2 | 10/2007 | MacInnes et al. | |
| 7,283,963 B1 | 10/2007 | Fitzpatrick et al. | |
| 7,290,283 B2 | 10/2007 | Copeland, III | |
| 7,315,826 B1 | 1/2008 | Guheen et al. | |
| 7,330,585 B2 | 2/2008 | Rice et al. | |
| 7,330,873 B2 * | 2/2008 | Yoshida et al. | 709/203 |
| 7,333,223 B2 | 2/2008 | Gupton et al. | |
| 7,333,233 B2 | 2/2008 | Gauthier | |
| 7,353,188 B2 | 4/2008 | Yim et al. | |
| 7,395,134 B2 * | 7/2008 | Bartholomew et al. | 700/233 |
| 7,409,208 B1 | 8/2008 | Clare et al. | |
| 7,479,956 B2 | 1/2009 | Shaw-Weeks | |
| 7,523,411 B2 | 4/2009 | Carlin | |
| 7,542,920 B1 | 6/2009 | Lin-Hendel | |
| 7,546,252 B2 * | 6/2009 | Hastings et al. | 705/28 |
| 7,570,261 B1 | 8/2009 | Edecker et al. | |
| 7,606,739 B1 | 10/2009 | Johnson | |
| 7,609,650 B2 | 10/2009 | Roskowski et al. | |
| 7,614,552 B2 | 11/2009 | Roseman et al. | |
| 7,620,565 B2 * | 11/2009 | Abelow | 705/7.32 |
| 7,644,151 B2 | 1/2010 | Jerrim et al. | |
| 7,650,381 B2 | 1/2010 | Peters | |
| 7,657,267 B2 * | 2/2010 | Kitazato | 455/456.3 |
| 7,680,694 B2 | 3/2010 | Glazer et al. | |
| 7,693,893 B2 | 4/2010 | Jadanovski et al. | |
| 7,734,495 B2 * | 6/2010 | Klaubauf et al. | 705/7.25 |
| 7,761,346 B2 | 7/2010 | Cooper et al. | |
| 7,797,373 B1 | 9/2010 | Berger | |
| 7,809,601 B2 * | 10/2010 | Shaya et al. | 705/7.31 |
| 7,826,923 B2 * | 11/2010 | Walker et al. | 700/238 |
| 7,827,047 B2 * | 11/2010 | Anderson et al. | 705/5 |
| 7,870,019 B2 * | 1/2011 | Williams et al. | 705/14.13 |
| 7,895,080 B2 | 2/2011 | Haynes et al. | |
| 7,895,082 B2 | 2/2011 | Veres et al. | |
| 7,904,975 B2 * | 3/2011 | Kruglikov et al. | 5/28 |
| 7,917,391 B2 * | 3/2011 | Smith et al. | 705/14.63 |
| 7,937,286 B2 * | 5/2011 | Newman et al. | 705/7.31 |
| 7,941,348 B2 | 5/2011 | Veres et al. | |
| 7,962,367 B1 * | 6/2011 | Fuisz et al. | 705/26.8 |
| 7,988,077 B2 | 8/2011 | Lin | |
| 8,051,078 B2 * | 11/2011 | Lau et al. | 707/732 |
| 8,065,201 B2 * | 11/2011 | Perkowski | 705/27.1 |
| 8,078,505 B2 | 12/2011 | Veres et al. | |
| 8,086,542 B2 | 12/2011 | Berger | |
| 8,086,696 B2 | 12/2011 | Berger | |
| 8,090,619 B1 * | 1/2012 | Hunter et al. | 705/26.1 |
| 8,090,626 B1 * | 1/2012 | Wijaya et al. | 705/26.8 |
| 8,117,113 B2 | 2/2012 | Erisman | |
| 8,175,908 B1 * | 5/2012 | Anderson | 705/7.29 |
| 8,175,909 B1 * | 5/2012 | Pileri et al. | 705/7.29 |
| 8,185,487 B2 * | 5/2012 | Tuzhilin et al. | 706/47 |
| 8,244,628 B1 | 8/2012 | Williams et al. | |
| 8,266,015 B2 * | 9/2012 | Johnson et al. | 235/383 |
| 8,271,049 B2 | 9/2012 | Silver et al. | |
| 8,306,937 B2 * | 11/2012 | Otto et al. | 706/47 |
| 8,346,571 B2 * | 1/2013 | Kalies, Jr. | 705/2 |
| 8,359,231 B2 * | 1/2013 | Fitzpatrick et al. | 705/14.27 |
| 8,429,037 B2 * | 4/2013 | Stone et al. | 705/30 |
| 2001/0027407 A1 | 10/2001 | Mori | |
| 2001/0032062 A1 | 10/2001 | Plaskoff et al. | |
| 2001/0044749 A1 | 11/2001 | Heisler et al. | |
| 2002/0087381 A1 | 7/2002 | Freeman et al. | |
| 2002/0090985 A1 | 7/2002 | Tochner et al. | |
| 2002/0093538 A1 | 7/2002 | Carlin | |
| 2002/0099611 A1 | 7/2002 | De Souza et al. | |
| 2002/0156797 A1 | 10/2002 | Lee et al. | |
| 2002/0161664 A1 | 10/2002 | Shaya et al. | |
| 2002/0161786 A1 | 10/2002 | Mangan et al. | |
| 2002/0188497 A1 | 12/2002 | Cerwin | |
| 2002/0198785 A1 | 12/2002 | Chae | |
| 2003/0028393 A1 | 2/2003 | Coulston et al. | |
| 2003/0033187 A1 | 2/2003 | Jones et al. | |
| 2003/0052877 A1 | 3/2003 | Schwegler, Jr. et al. | |
| 2003/0080975 A1 | 5/2003 | Kuroki et al. | |
| 2003/0122872 A1 | 7/2003 | Chiang et al. | |
| 2003/0128205 A1 | 7/2003 | Varghese | |
| 2005/0162419 A1 | 7/2005 | Kim et al. | |

FOREIGN PATENT DOCUMENTS

| | | |
|---|---|---|
| WO | WO 01/11526 A1 | 2/2001 |
| WO | WO 01/67372 A1 | 9/2001 |
| WO | WO 01/82101 A1 | 11/2001 |
| WO | WO02/39216 | 5/2002 |
| WO | WO 02/101501 A2 | 12/2002 |

OTHER PUBLICATIONS

Mexico Office Action for Design Application PA/A/2006/010249, dated Nov. 19, 2009.
Taiwan Office Action for Application 094107157, dated Jan. 26, 2010.
Examination Report for Indian Patent Application 2559/KOLNP/2006, dated Feb. 25, 2011.
European Office Action for Application 05724033.5, dated Mar. 4, 2011.
European Search Report issued in EP Application No. 11004760.2 dated Sep. 13, 2011.
Canadian Office Action issued in CA Application No. 2,558,156 dated Jan. 11, 2012.
Office Action issued in related EP Application No. 11004760.2, dated Jun. 27, 2012.
HomeProject.com and IBM Form Strategic Relationship To Help Customers Build Their Dream Home Online. Feb. 24, 2000. Canada NewsWire, Ottowa, pp. 1-2; http://proquest.umi.com/pqdweb?did=54571468&sid=2&Fmt=3&clientd=19649&RQT=309&VName=PQD.

* cited by examiner

SYSTEMS, METHODS AND COMPUTER PROGRAM PRODUCTS FOR IMPLEMENTING PROCESSES RELATING TO RETAIL SALES

CROSS REFERENCES TO RELATED APPLICATIONS

This application is a continuation of and claims priority from allowed, co-pending U.S. patent application Ser. No. 10/796,485, filed on Mar. 9, 2004 and entitled "SYSTEMS, METHODS AND COMPUTER PROGRAM PRODUCTS FOR IMPLEMENTING PROCESSES RELATING TO RETAIL SALES", the entire contents of which are incorporated herein by reference.

This application is also filed concurrently with five sibling continuation applications each claiming priority from allowed, U.S. patent application Ser. No. 10/796,485, each concurrently filed continuation application entitled "SYSTEMS, METHODS AND COMPUTER PROGRAM PRODUCTS FOR IMPLEMENTING PROCESSES RELATING TO RETAIL SALES", and having Ser. Nos. as follows: Ser. No. 12/928,956 (now published as U.S. Patent Application Publication No. 2011/0106650), Ser. No. 12/930,009 (now published as U.S. Patent Application Publication No. 2011/0173088), Ser. No. 12/928,981 (now published as U.S. Patent Application Publication No. 2011/0106652), Ser. No. 12/930,010 (now published as U.S. Patent Application Publication No. 2011/0166954), and Ser. No. 12/928,979 (now published as U.S. Patent Application Publication No. 2011/0106651), the entire contents of each incorporated herein by reference.

BACKGROUND OF THE INVENTION

1. Field of the Invention

The present invention relates to systems, processes, and computer program products for the sourcing, scheduling, sales, billing, inventory management, product presentation, delivery, customer management and other functions relating to the provision of goods and services, particularly in the retail sales environment.

2. Description of Related Art

The efficient provision of goods and services to customers by retailers involves a variety of discrete tasks on the part of a retailer, including, without limitation, sourcing and scheduling inventory, product presentation and management, pricing, delivery and installation scheduling, customer billing, inventory management, vendor management, vendor payment, and/or customer management. Moreover, delivery and/or installation of purchased products present separate, but often desired or necessary tasks, particularly for customers looking for a turnkey solution. Inefficiencies in the implementation of these tasks can be detrimental to the financial performance of a retailer's business, including errors in product selection and ordering, excess inventory costs, lost sales, and customer dissatisfaction, just to name a few. Further, ineffective or inefficient execution of these tasks impacts a retailer's ability to keep up with changing demands of the marketplace, all of which results in lost sales and lost opportunities. Since different individuals and/or departments within a retailer implement many of these tasks, it can be difficult to manage the implementation of these various tasks so as to insure that the tasks are completed timely and accurately, and in the most cost effective manner. These tasks (or the problems created by ineffective and/or inefficient execution of them) are common to retailers in a variety of fields or markets, including consumer electronics, household appliances, furniture, clothing, sporting equipment, motorized vehicles, toys and playground equipment, groceries, and home improvement.

For example, a home improvement project can be a daunting task for a homeowner lacking experience in planning and implementing such a project, particularly a project that involves a number of different products and/or services such as remodeling a kitchen or bathroom, which likely involves electrical, plumbing, appliances, cabinetry, flooring, etc. Often, such home improvement projects require an extensive amount of planning, including measurements of the space to be improved, selection of various products to be installed, selection of the more detailed aspects of the products, such as colors, textures, finishes, etc., delivery of the products and, importantly, their installation. Often, not all of the desired products are in stock at a particular home improvement store and vendors (either through catalogs, Internet, etc.) must be consulted, which is often a tedious process inasmuch as such secondary sources may not have sufficient details to visualize the expected result. In addition, the planning, design and selection tasks can also involve consulting with multiple sales persons, contractors and other parties. For instance, a customer that wants to refinish a kitchen may need to interact with a cabinet designer, a flooring specialist, a millwork specialist, an appliance specialist and various representatives of other specialties such as hardware, lighting and plumbing. Decisions must be made with respect to each of these areas to achieve an acceptable completed project.

In addition to selecting the building materials, appliances, accessories, etc. to be used in the project, the homeowner must schedule both the delivery and the installation of the purchased items. It is typically not acceptable that all items are delivered at once or in a random, drawn out fashion. Indeed, it is often critical that the items arrive in a predetermined order that allows for effective installation. Furthermore, homeowners often desire that contractors or skilled installers perform some or all of the necessary installation. In both cases it is necessary that delivery of items and installation be scheduled relative to one another to permit acceptable and timely completion of the project.

In addition to the difficulties of planning and designing the project, and selecting the necessary materials and products, the homeowner is also typically concerned about the overall cost of the project. The cost of each home improvement project includes not only the cost of materials, tools, appliances, accessories, etc., but also the delivery and installation of these items. Installation costs are difficult to estimate due to the need to contact multiple contractors, the reliability of which may be unknown to the customer. Further, the planning and design of, and selection of products for, the home improvement project may need to be modified if the overall cost of the project exceeds the amount budgeted by the customer. As a result, the planning, design, and selection tasks may have to undergo several iterations. All of these difficulties make it very desirable for a customer to have tools that facilitate the planning, design, selection, delivery, installation, and cost management of the home improvement project.

Aside from the homeowner, the home improvement retailer must attempt to make as many different products and services available to its customers, must facilitate efficient delivery of the products and services and often must provide installation services. In addition, the retailer must coordinate customer management among its customer representatives, management of sales opportunities, ordering of inventory and any custom or configurable products selected by a customer, vendor payments, and customer billing. Ineffective and/or inefficient management of these tasks can result in lost sales opportunities, returns, etc., which can adversely affect the profitability of the retailer.

In seeking to integrate aspects of the sales process, others have proposed interactive systems to assist customers with the design and ordering of products and services. For example, U.S. Patent Application Publication No. 2001/0044749 to Heisler et al. ("Heisler") discloses a home improvement system 10 embodied in a web site allowing customers to identify the materials needed for a project and then to order the corresponding materials. The home improvement system can communicate with the customer 50 and a third-party business 60. The web site includes a collection of software tools for designing home improvements such as decks, shelves, kitchens or bathrooms. The software tools can include "solution tools" that facilitate calculations of needed materials. For instance, the solution tools can calculate an amount of wallpaper, ceiling tiles or concrete necessary to complete a project. According to one embodiment, Heisler discloses the use of graphics to lay out the property perimeter, home and landscape features for designing a sprinkler system. During design, the home improvement system can suggest parts and accessories from a list of sprinkler products. Once a design is finalized, it can be transmitted to the third-party business, which can modify the design to fit existing inventory and make other design suggestions. The home improvement system can then output a shopping list that contains information identifying the various parts, prices and assembly references to facilitate purchases. Alternatively, the purchase may be submitted electronically to the third-party business and the materials picked up later at the business.

Although Heisler addresses some of the needs of the customer and retailer and, in particular, assisting the customer with the design of the home improvement project, Heisler fails to provide an integrated solution and, more specifically, it fails to address a number of the tasks involved with facilitating the sale, including coordination of installation services for those customers not wanting to install the project themselves, scheduling, billing, vendor payments and inventory management for the retailer. In addition, Heisler does not provide for interaction with sales persons, contractors and other parties with important knowledge that may improve the design and selection tasks. With these and other steps not facilitated, the customer is still required to carry most of the design to execution with little assistance and the retailer is still required to coordinate all of its procurement, billing, vendor payment and customer management tasks. Similar problems affect customers and retailers in other fields, including consumer electronics, household appliances, furniture, clothing, sporting equipment, toys and playground equipment, groceries, and motorized vehicles, just to name a few.

It would be advantageous to have a system that is not only capable of facilitating product design and/or selection, but that can also facilitate execution of the design, selection and sales tasks for the customer, retailer and vendors. It would be further advantageous if facilitating execution of the design, selection and sales tasks included involving customer representatives, vendors and other third parties that are not readily available to, or known by, the customer; allowed the selection and scheduling of related services, such as detailed measurement, delivery, installation, maintenance, warranty, etc., if necessary; and facilitated customer management, management of sales opportunities, inventory management, vendor management, vendor payments, customer billing for the retailer, and communication between each of these different entities.

BRIEF SUMMARY OF THE INVENTION

The present invention addresses the above needs and achieves other advantages by providing a system that facilitates the selection of purchasable items by a customer and that allows greater choice, flexibility and design input by customers and that allows for the integration of the customer's selection of purchasable items into retailer processes for providing and administering the provision of purchasable items. The system includes a number of processes that individually have value, but that collectively can provide a fully integrated solution for the retailer, customer and vendors.

According to one embodiment of the present invention, the system facilitates the selection of purchasable items for use in an environs defined by the customer. In one aspect, the system includes a processing element capable of proposing a plurality of purchasable items to the customer for selection by the customer. The processing element also is capable of requesting, receiving and processing data representing the environs and data representing at least one purchasable item selected by the customer. The processing element is further capable of generating and displaying a three-dimensional graphical representation of the environs and each purchasable item or items selected by the customer so that the customer can visualize the items in the environs. In one embodiment, the processing element is capable of proposing a template for at least one environs to the customer for selection by the customer. In another embodiment, the environs include a kitchen, a bathroom, a room, or an exterior space.

According to another embodiment of the present invention, the system includes a processing element capable of requesting, receiving and processing data representing at least one customer preference. The processing element is capable of storing data representing a first set of purchasable items. The processing element also is capable of proposing a second set of purchasable items to the customer for selection by the customer. The processing element is further capable of filtering the first set of purchasable items based at least in part upon the at least one customer preference to generate the second set of purchasable items.

According to another embodiment of the present invention, the system includes a processing element capable of proposing a first set of purchasable items to the customer for selection by the customer. The processing element is capable of requesting, receiving and processing data representing at least one purchasable item selected by the customer from the first set of purchasable items. The processing element is further capable of proposing a second set of purchasable items to the customer for selection by the customer. The processing element is capable of requesting, receiving and processing data representing at least one purchasable item selected by the customer from the second set of purchasable items. The processing element generates the second set of purchasable items based at least in part upon the at least one purchasable item selected by the customer from the first set of purchasable items.

According to another embodiment, the system includes a processing element capable of proposing a plurality of purchasable items to the customer for selection by the customer. The processing element is also capable of requesting, receiving and processing data representing at least one purchasable item selected by the customer. The processing element is further capable of scheduling the installation of, and/or on-site measurement for, the at least one purchasable item selected by the customer.

According to another embodiment, the present invention provides a system for facilitating the selection of purchasable items by a customer and ordering of the selected purchasable items from a vendor. In one aspect, the system includes a processing element capable of proposing a plurality of purchasable items to the customer for selection by the customer. The processing element is capable of requesting, receiving and processing data representing at least one purchasable item selected by the customer. The processing element is further capable of communicating data representing the at least one purchasable item selected by the customer to the vendor.

According to another embodiment, the present invention provides a system for facilitating the selection of configurable purchasable items by a customer and the manufacture of selected configurable purchasable items by a vendor. In one aspect, the system includes a processing element capable of proposing a plurality of configurable purchasable items to the customer for selection by the customer. The processing element is capable of requesting, receiving and processing data representing at least one configurable purchasable item selected by the customer. The processing element is capable of soliciting from the customer specifications for the at least one configurable purchasable item selected by the customer. The processing element is also capable of requesting, receiving and processing data representing the specifications for the at least one configurable purchasable item selected by the customer. The processing element is further capable of communicating data representing the specifications for the at least one configurable purchasable item selected by the customer to the vendor.

According to another embodiment, the present invention provides a system for facilitating the selection of configurable purchasable items by a customer and the provision of service by an in-store customer representative. In one aspect, the system includes a processing element capable of proposing a plurality of configurable purchasable items to the customer for selection by the customer. The processing element is also capable of requesting, receiving and processing data representing at least one configurable purchasable item selected by the customer. The processing element is further capable of scheduling an appointment for the customer with the in-store customer representative relating to the at least one configurable purchasable item selected by the customer.

According to another embodiment, the present invention provides a system for facilitating the management of sales opportunities for purchasable items offered to a customer. In one aspect, the system includes a processing element capable of proposing a plurality of purchasable items to the customer for selection by the customer. The processing element is also capable of requesting, receiving and processing data representing at least one purchasable item selected by the customer. The processing element is further capable of prompting a customer representative to contact the customer based upon the data received representing the at least one purchasable item selected by the customer.

In another embodiment, the system includes a processing element capable of proposing a plurality of purchasable items to a plurality of customers for selection by the customers. The processing element is also capable of requesting, receiving and processing and storing data representing at least one purchasable item selected by each customer and data representing at least one sales variable for each customer. The processing element is further capable of comparing the at least one sales variable for at least two customers.

According to other embodiments of the present invention, the system can integrate one or more of the functionalities described above together, as well as include other functionalities to provide a total solution for both the customer and retailer. For example, in one embodiment, the system can include a processing element capable of issuing a payment to a vendor and/or invoicing or billing a customer based at least partially upon the at least one purchasable item selected by the customer. In another embodiment, the system can include a processing element capable of requesting, receiving and processing data representing instructions relating to pricing, discounts, etc. for the purchasable items and then implementing or deploying the instructions throughout the entire system wherein the system comprises a multi-store and/or multi-terminal system.

According to another embodiment, the present invention provides a computer program product for facilitating the selection of purchasable items by a customer for use in an environs defined by the customer. The computer program product includes a computer-readable storage medium having computer-readable program code portions stored therein. In one aspect, the computer-readable program portions include an executable portion for proposing a plurality of purchasable items to the customer for selection by the customer. The executable portion requests, receives and processes data representing the environs and data representing at least one purchasable item selected by the customer. The executable portion generates a three-dimensional graphical representation of the environs and the at least one purchasable item selected by the customer so that the customer can visualize the selected purchasable items in the environs. In one embodiment, the executable portion proposes a template for at least one environs to be selected by the customer. In another embodiment, the environs include a kitchen, a bathroom, a room, and an exterior space.

In another embodiment, the present invention provides a computer program product for facilitating the selection of purchasable items by a customer. The computer program product comprising a computer-readable storage medium having computer-readable program code portions stored therein. In one aspect, the computer-readable program portions include an executable portion for requesting, receiving and processing data representing at least one customer preference. The executable portion requests, receives and processes data representing a first set of purchasable items. The executable portion proposes a second set of purchasable items to the customer for selection by the customer. The executable portion filters the first set of purchasable items based at least in part upon the at least one customer preference to generate the second set of purchasable items.

In another embodiment, the computer-readable program portions include an executable portion for proposing a first set of purchasable items to the customer for selection by the customer. The executable portion requests, receives and processes data representing at least one purchasable item selected by the customer from the first set of purchasable items. The executable portion proposes a second set of purchasable items to the customer for selection by the customer. The executable portion requests, receives and processes data representing at least one purchasable item selected by the customer from the second set of purchasable items. The executable portion generates the second set of purchasable items based at least in part upon the at least one purchasable item selected by the customer from the first set of purchasable items.

In another embodiment, the computer-readable program portions include an executable portion for proposing a plurality of purchasable items to the customer for selection by the customer. The executable portion requests, receives and processes data representing at least one purchasable item selected by the customer. The executable portion schedules the installation of, and/or on-site measurement for, the at least one purchasable item selected by the customer.

In another embodiment, the present invention provides a computer program product for facilitating the selection of purchasable items by a customer and ordering of the selected purchasable items from a vendor. The computer program product includes a computer-readable storage medium having computer-readable program code portions stored therein. In one aspect, the computer-readable program portions include an executable portion for proposing a first set of purchasable items to the customer for selection by the customer. The executable portion requests, receives and processes data representing at least one purchasable item selected by the customer from the first set of purchasable items. The executable portion proposes a second set of purchasable items to the customer for selection by the customer. The executable portion requests, receives and processes data representing at least one purchasable item selected by the customer from the second set of purchasable items. The executable portion generates the second set of purchasable items based at least in part upon the at least one purchasable item selected by the customer from the first set of purchasable items.

In another embodiment, the computer-readable program portions include an executable portion for proposing a plurality of purchasable items to the customer for selection by the customer. The executable portion requests, receives and processes data representing at least one purchasable item selected by the customer. The executable portion communicates data representing the at least one purchasable item selected by the customer to the vendor.

In another embodiment, the present invention provides a computer program product for facilitating the selection of configurable purchasable items by a customer and the manufacture of selected configurable purchasable items by a vendor. The computer program product includes a computer-readable storage medium having computer-readable program code portions stored therein. In one aspect, the computer-readable program portions include an executable portion for proposing a plurality of configurable purchasable items to the customer for selection by the customer. The executable portion requests, receives and processes data representing at least one configurable purchasable item selected by the customer. The executable portion solicits from the customer specifications for the at least one configurable purchasable item selected by the customer. The executable portion requests, receives and processes data representing the specifications for the at least one configurable purchasable item selected by the customer. The executable portion communicates data representing the specifications for the at least one configurable purchasable item selected by the customer to the vendor.

In another embodiment, the present invention provides a computer program product for facilitating the selection of configurable purchasable items by a customer and the provision of service by an in-store customer representative. The computer program product includes a computer-readable storage medium having computer-readable program code portions stored therein. In one aspect, the computer-readable program portions include an executable portion for proposing a plurality of configurable purchasable items to the customer for selection by the customer. The executable portion requests, receives and processes data representing at least one configurable purchasable item selected by the customer. The executable portion schedules an appointment for the customer with the in-store customer representative relating to the at least one configurable purchasable item selected by the customer.

In another embodiment, the present invention provides a computer program product for facilitating the management of sales opportunities for purchasable items offered to a customer. The computer program product includes a computer-readable storage medium having computer-readable program code portions stored therein. In one aspect, the computer-readable program portions include an executable portion for proposing a plurality of purchasable items to the customer for selection by the customer. The executable portion requests, receives and processes data representing at least one purchasable item selected by the customer. The executable portion prompts a customer representative to contact the customer based upon the data received representing the at least one purchasable item selected by the customer.

In another embodiment, the computer-readable program portions include an executable portion for proposing a plurality of purchasable items to a plurality of customers for selection by the customers. The executable portion requests, receives and processes data representing at least one purchasable item selected by each customer and data representing at least one sales variable for each customer. The executable portion compares the at least one sales variable for at least two customers.

According to other embodiments of the present invention, the computer program product can integrate one or more of the functionalities described above together, as well as include other functionalities to provide a total solution for both the customer and retailer. For example, in one embodiment, the computer program product includes an executable portion that issues a payment to a vendor and/or invoices or bills a customer based at least partially upon the at least one purchasable item selected by the customer. In another embodiment, the computer program product includes an executable portion element that requests, receives and processes data representing instructions relating to pricing, discounts, etc. for the purchasable items and then implements or deploys the instructions throughout a multi-store or multi-terminal system.

In another embodiment, the present invention provides a method for facilitating the selection of purchasable items by a customer for use in an environs defined by the customer. In one aspect, the method includes proposing a plurality of purchasable items to the customer for selection by the customer. Data representing the environs and data representing at least one purchasable item selected by the customer are requested, received and processed electronically. A three-dimensional graphical representation of the environs and the at least one purchasable item selected by the customer are generated. The three-dimensional graphical representation of the environs and the at least one purchasable item selected by the customer are displayed so that the customer can visualize the at least one selected purchasable item in the environs. In one embodiment, a template for at least one environs is proposed to the customer for selection by the customer. In another embodiment, the environs include a kitchen, a bathroom, a room, and an exterior space.

In another embodiment, the present invention provides a method for facilitating the selection of purchasable items by a customer. In one aspect, the method includes storing electronically data representing a first set of purchasable items. Data representing at least one customer preference is requested, received and processed electronically. A second set of purchasable items is proposed to the customer for selection by the customer. The first set of purchasable items is filtered based at least in part upon the at least one customer preference to generate the second set of purchasable items.

In another embodiment, the method includes proposing a first set of purchasable items to the customer for selection by the customer. Data representing at least one purchasable item selected by the customer from the first set of purchasable items is requested, received and processed electronically. A second set of purchasable items is proposed to the customer for selection by the customer. Data representing at least one purchasable item selected by the customer from the second set of purchasable items is requested, received and processed electronically. The second set of purchasable items is generated based at least in part upon the at least one purchasable item selected by the customer from the first set of purchasable items.

In another embodiment, the method includes proposing a plurality of purchasable items to the customer for selection by the customer. Data representing at least one purchasable item selected by the customer is requested, received and processed electronically. The installation of, and/or on-site measurement for, the at least one purchasable item selected by the customer is scheduled.

In another embodiment, the present invention provides a method for facilitating the selection of purchasable items by a customer and ordering of the selected purchasable items from a vendor. In one aspect, the method includes proposing a plurality of purchasable items to the customer for selection by the customer. Data representing at least one purchasable item selected by the customer is requested, received and processed electronically. Data representing the at least one purchasable item selected by the customer is communicated electronically to the vendor.

In another embodiment, the present invention provides a method for facilitating the selection of configurable purchasable items by a customer and the manufacture of selected configurable purchasable items by a vendor. In one aspect, the method includes proposing a plurality of configurable purchasable items to the customer for selection by the customer. Data representing at least one configurable purchasable item selected by the customer is requested, received and processed electronically. Specifications for the at least one configurable purchasable item selected by the customer are solicited from the customer. Data representing the specifications for the at least one configurable purchasable item selected by the customer is requested, received and processed electronically. Data representing the specifications for the at least one configurable purchasable item selected by the customer are communicated electronically to the vendor.

In another embodiment, the present invention provides a method for facilitating the selection of configurable purchasable items by a customer and the provision of service by an in-store customer representative. In one aspect, the method includes proposing a plurality of configurable purchasable items to the customer for selection by the customer. Data representing at least one configurable purchasable item selected by the customer is requested, received and processed electronically. An appointment is scheduled for the customer with the in-store customer representative relating to the at least one configurable purchasable item selected by the customer.

In another embodiment, the present invention provides a method for facilitating the management of sales opportunities for purchasable items offered to a customer. In one aspect, the method includes proposing a plurality of purchasable items to the customer for selection by the customer. Data representing at least one purchasable item selected by the customer is requested, received and processed electronically. A customer representative is prompted to contact the customer based upon the data received representing the at least one purchasable item selected by the customer.

In another embodiment, the method includes proposing a plurality of purchasable items to a plurality of customers for selection by the customers. Data representing at least one purchasable item selected by each customer and data representing at least one sales variable for each customer is requested, received and processed electronically. Data representing at least one purchasable item selected by each customer and data representing at least one sales variable for each customer is stored electronically. The at least one sales variable for at least two customers is compared.

According to other embodiments of the present invention, the method includes issuing a payment to a vendor and/or invoicing or billing a customer based at least partially upon the at least one purchasable item selected by the customer. In another embodiment, the method includes requesting, receiving and processing data representing instructions relating to pricing, discounts, etc. for the purchasable items and then implementing or deploying the instructions throughout a multi-store or multi-terminal system.

Although the types of purchasable items will vary depending upon the type of retail industry, in one embodiment the purchasable items include furniture, appliances, flooring, decking, lighting, countertops, millwork, doorframes, window frames, doors, windows, paint, wall coverings, cabinetry, shelving, design services, installation services, and measuring services.

According to another embodiment, the present invention provides a home improvement system. In one aspect, the system includes a catalog module that is capable of proposing a plurality of purchasable items to a customer, such as home improvement goods and services. The customer's selection of the purchasable items preferably is stored by the catalog module in a computer-readable memory. The system can include an envisioning module that is capable of generating and displaying a three-dimensional graphical depiction of selected purchasable items in the environs in which the selected items will be used, as defined by the customer. The system can include a scheduling module that provides scheduling options with in-store customer representatives having expertise with the selected purchasable items. The system can include a lead management module in communication with the catalog module. The catalog module communicates customer contact information and selections of purchasable items to the lead management module, which is configured to prompt follow-up contact by a customer representative. The system can also include other systems, such as a vendor management module, an order management module, an event management module, a payment module, and a billing module, wherein the system facilitates the entire home improvement project from planning, design and selection through to delivery, installation and quality confirmation for both the customer and the retailer.

Other aspects of the catalog module can include the capability of presenting purchasable items at certain quality levels or price ranges. The catalog module can also be configured to store in a computer-readable memory specifications for the purchasable items, such as color, size, options, etc. The catalog module can supplement the presented purchasable items by proposing accessories, such as upon selection of one of the purchasable items. Also, the catalog module can present delivery and/or installation services for selection by the customer, wherein the delivery and/or installation services are associated with one or more of the selected purchasable items. The catalog module can also be configured to present custom or special order purchasable products referred to herein as "configurable purchasable items", which the retailer does not stock at a particular store or chain of stores. "Configurable purchasable items" can also include custom or special order purchasable services, such as delivery and installation services. Upon selection of a configurable purchasable item, the catalog module preferably is configured to solicit specifications for the selected configurable purchasable item and store the specifications in a computer-readable memory.

The envisioning module can also include other aspects. For instance, the envisioning module can include a plurality of project templates. After selection of a project template, the envisioning module preferably is configured to solicit from the customer specifications for the environs in which the selected purchasable items will be used. The envisioning module preferably is configured to modify its graphical depiction of selected purchasable items in the environs based upon responses received from the customer. The envisioning module can also be configured to display a list of purchasable items required to complete the graphical depiction. Notes entered by the customer during design and/or selection iterations can be stored by the envisioning module in a computer-readable memory.

The scheduling module is in communication with the catalog module and is capable of receiving the customer's selection of purchasable items from the catalog module. The scheduling module is further capable of presenting or proposing one or more scheduling options to the customer indicating opportunities to meet with an in-store customer representative to obtain additional information and/or further refine the selection of purchasable items. Other aspects of the scheduling module can include the capability of presenting a selection of stores at which the in-store customer representative can meet the customer. In addition, the scheduling module can be configured to withhold final scheduling of an appointment until confirmation is received of a person-to-person verification of the selected scheduling option with the customer. Scheduling options can be presented as a set of available time slots for the in-store customer representatives that are available to meet with the customer. The in-store customer representatives themselves may also configure the scheduling module to limit their own availability for scheduling. The scheduling module can be configured to prompt one of the in-store customer representatives for acceptance of one of the scheduling options selected by the customer.

The system can also include a vendor management module in communication with the catalog module and capable of receiving information on the purchasable items provided by the vendor, including, without limitation, pricing, availability, selection, etc. The vendor management module preferably is capable of communicating the information to the catalog module for presentation to the customer. Additionally, the vendor management module can be configured to perform various screening tasks to ensure that the customer receives purchasable items from quality vendors. For instance, the vendor management module can initiate and perform an application process for prospective vendors and can certify those prospective vendors successfully completing the application process. The vendor management module can also conduct customer surveys to determine the customers' opinion and comments relating to quality of workmanship. In addition, the vendor management module can be configured to receive and store inspection information resulting from an inspection of purchasable items, such as installation services, provided by the vendors.

The system can also include an order management module in communication with the catalog module and the envisioning module. In one aspect, the order management module receives information pertaining to the purchasable items selected by the customer and is capable of generating orders to the corresponding vendor or vendors for the purchasable items. Also, the order management module can interact with various vendors by placing the order and receiving order status updates from the vendors. Preferably, the order management module stores the order information and order status updates in a computer-readable memory, which is accessible by each of a plurality of stores, vendors, customers and other interested parties. The catalog module preferably is capable of generating an order for the configurable purchasable item based at least partially upon the specifications received from the customer.

In another aspect, the scheduling module can be in communication with the order management module and can be configured to present time ranges for delivery and/or installation of the selected purchasable items. These time ranges can be presented graphically in a flow chart or process map defining each task, such as vendor ordering, shipping, delivery and/or installation services.

In another aspect, the systems includes an event management module, which is in communication with the order management module and is capable of determining relationships between the purchasable items, such as the relationship between the products and their delivery and/or installation. For instance, paving stones may require delivery and landscaping services for installation. In addition, the event management module can establish a hierarchy of product deliveries and installation services to ensure that the dependent tasks are executed in the necessary order. Once the hierarchy has been determined, the event management module is capable of communicating portions of the execution hierarchy to various parties, such as the customer, customer representative, and/or vendors.

The event management module can also be configured to monitor execution of the product deliveries and installation services by receiving data representing modifications to the relationship and/or completion of the corresponding tasks from the vendor. In cases where delays or other issues are encountered, the event management module is capable of modifying the execution hierarchy accordingly. Upon receiving data representing completion of delivery and/or installation of a product, the event management module can notify the vendor management module. In response, the vendor management module can be configured to conduct customer surveys. For example, the customer can be sent a survey electronically via the Internet or can be sent correspondence, such as an electronic mail or a letter, requesting the customer to complete the survey on-line at the retailer's website. Preferably, the event management module is in communication with a centralized database stored in a computer-readable memory that contains the execution hierarchy information and is accessible by a plurality of stores.

According to another embodiment, the system provides a lead management module, which is in communication with the catalog module and is capable of receiving the customer's selection of purchasable items and customer contact information from the catalog module. The lead management module is configured to generate a reminder or prompt for a customer representative to contact the customer, wherein a lead in the form of the customer's selection of purchasable items and the customer's contact information is provided in the reminder or prompt. In another aspect, the lead management module can be configured to identify and store in a computer-readable memory one or more sales variables for customers, such as sales progress touch points for lead-generated sales. Using the sales progress touch points, the lead management module can also analyze, determine and generate a report pertaining to the effectiveness of one or more stores or departments at capitalizing on the leads. For instance, the lead management module can calculate the average number of touch points reached for a collection of leads.

The present invention has many advantages. For instance, the system overcomes the difficulties encountered in the prior art by providing a solution that not only is capable of facilitating product design and/or selection, but that can also facilitate execution of the design, selection and sales tasks for both the customer and retailer. The solution of the present invention integrates into the design, selection and sales tasks the involvement of salespersons, vendors and other third parties that are not readily available to, or known by, the customer; allows the selection and scheduling of related services, such as detailed measurement, delivery, installation, etc., if necessary; and facilitates customer management, management of sales opportunities, inventory management, vendor payments, and customer billing for the retailer.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Figure 1:
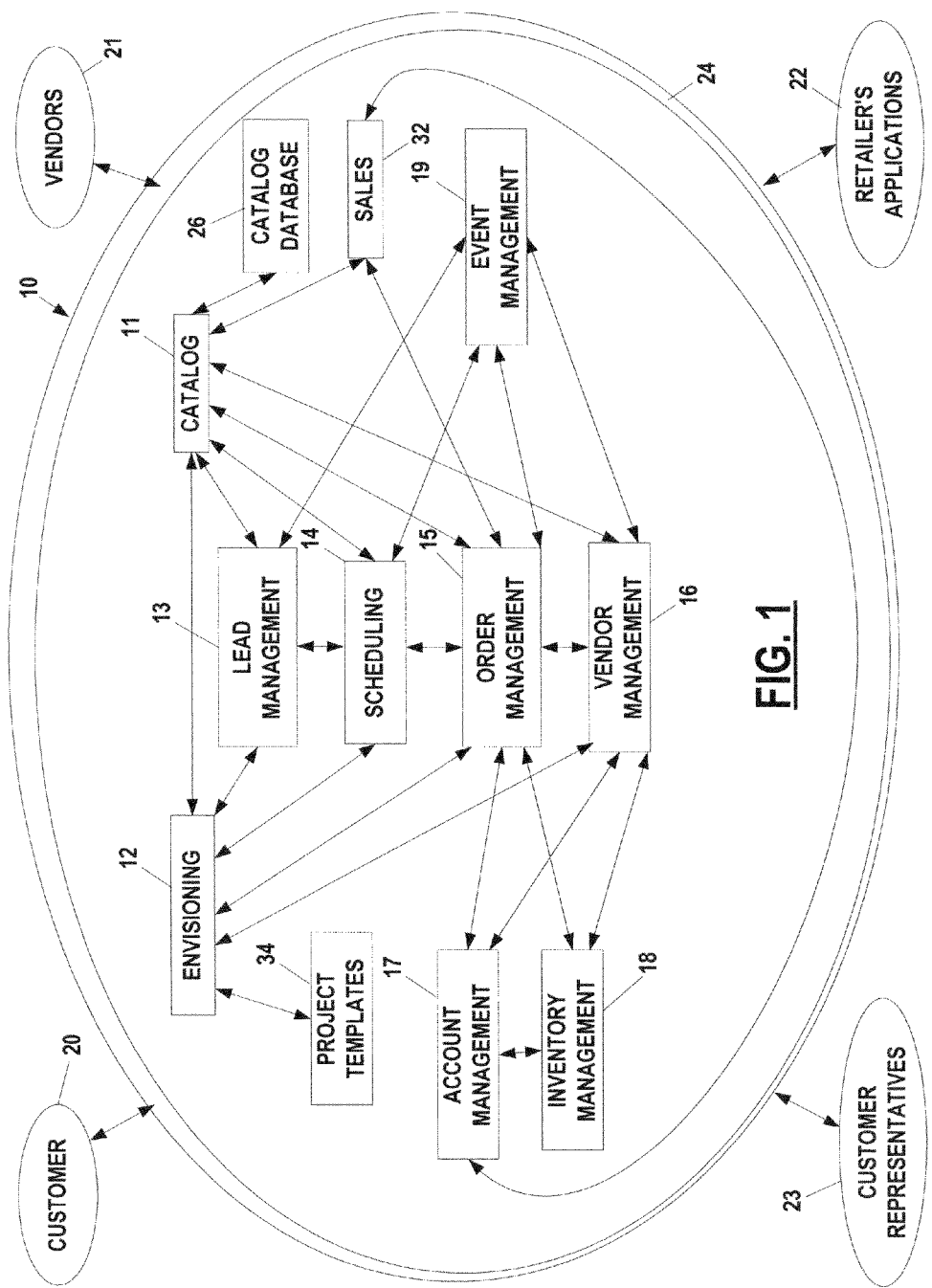
Figure 2:
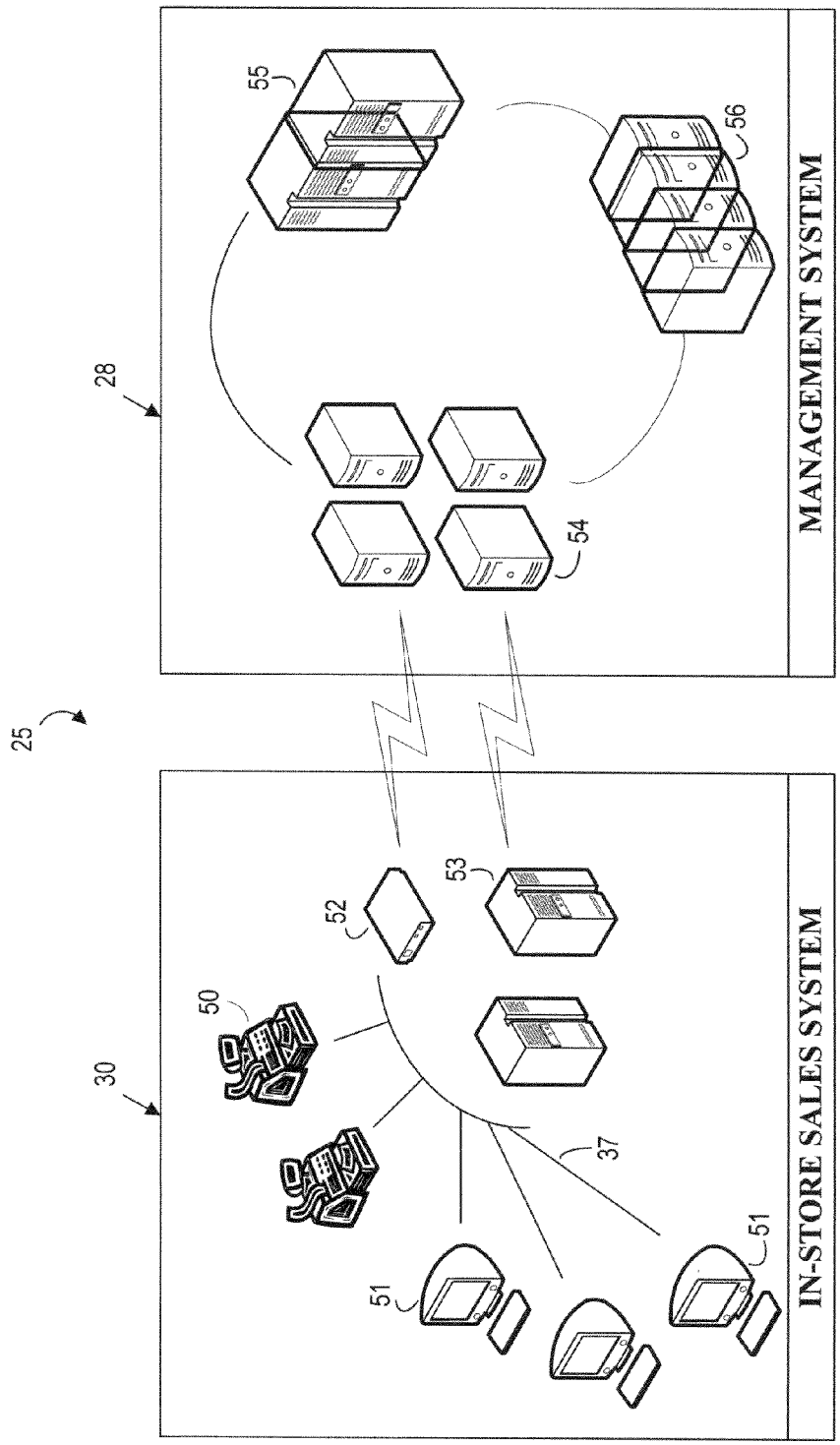
Figure 3:
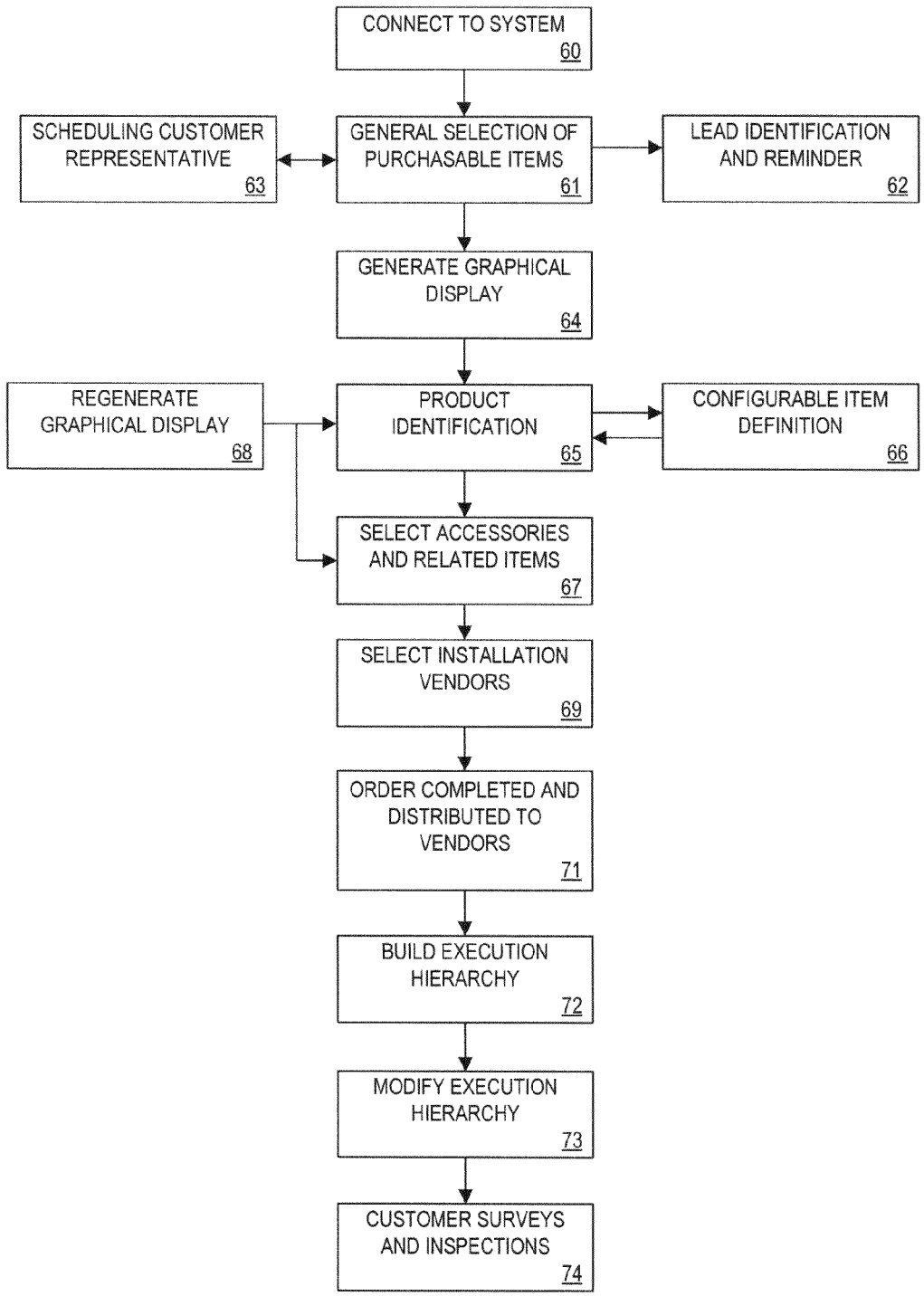
Figure 4:
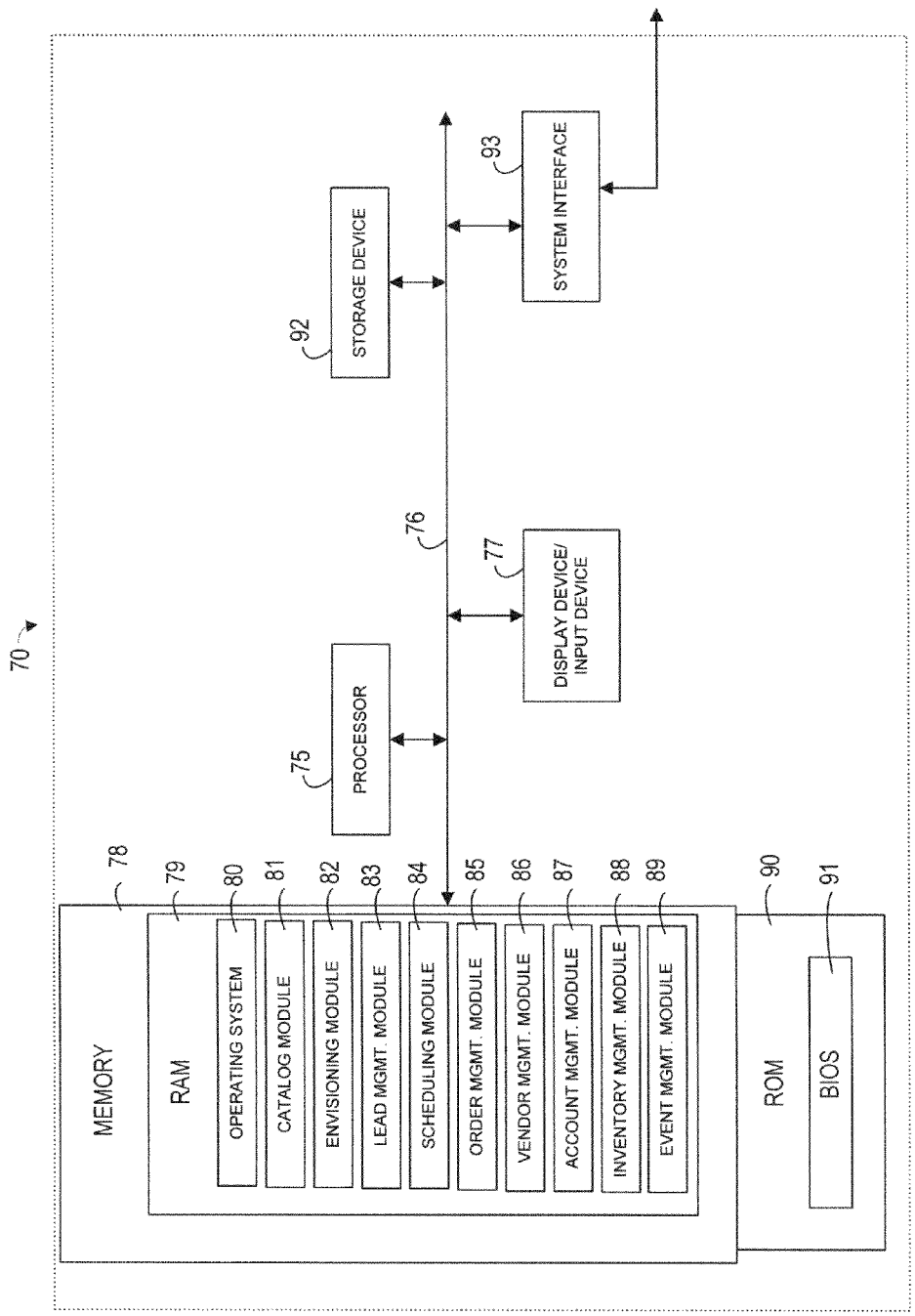
Figure 5:
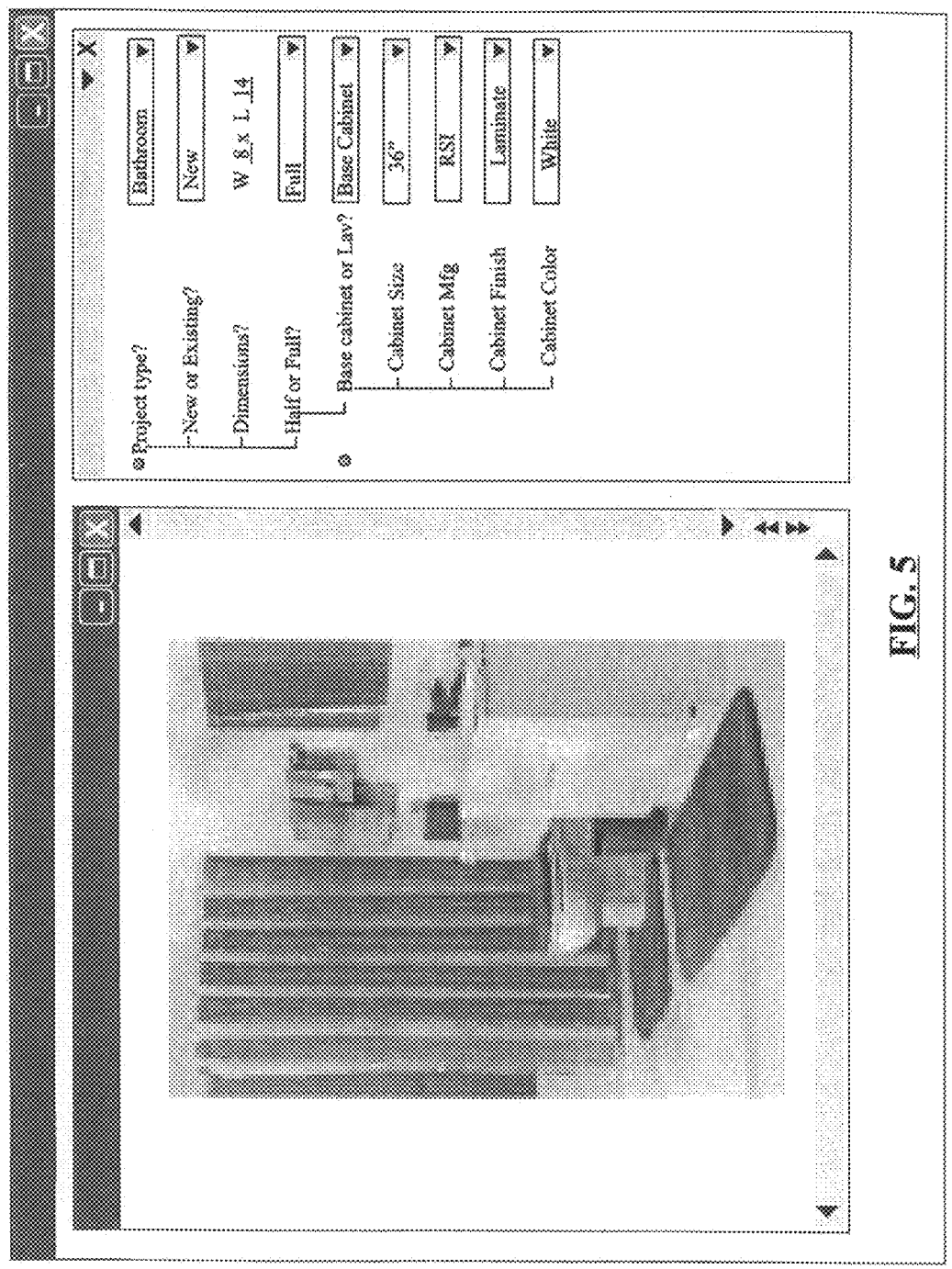

Having thus described the invention in general terms, reference will now be made to the accompanying drawings, which are not necessarily drawn to scale, and wherein:

FIG. 1 is a schematic diagram of a system used in home improvement retailing, according to one embodiment of the present invention;

FIG. 2 is a schematic of a hardware configuration of a system used in home improvement retailing, according to another embodiment of the present invention;

FIG. 3 is a flow chart of a method used in home improvement retailing, according to one embodiment of the present invention;

FIG. 4 is a schematic of a system used in home improvement retailing, according to yet another embodiment of the present invention; and FIG. 5 is a representation of the graphical output generated by the envisioning module, according to one embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring to FIGS. 1 and 2, there is illustrated a system 10, according to one embodiment of the present invention. The system 10 includes one or more of the software, hardware and firmware driven applications or modules 11-19 illustrated in FIG. 1, which interact and communicate to facilitate the design and/or selection of purchasable items by a customer; selection of a vendors for purchasable items; involve customer representatives, vendors and other third parties that are not readily available to, or known by, the customer; allow the selection and scheduling of related services, such as detailed measurement, delivery, installation, maintenance, warranty, etc., if necessary; and/or facilitate customer management, management of sales opportunities, inventory management, vendor management, vendor payments, and customer billing for the retailer. While not required, the modules 11-19 that form the system 10 preferably are at least partially integrated so as to provide a more robust and functional solution for the customers, retailer, and vendors. These, and other modules, of the system 10 are accessible by customers 20, vendors 21, other corporate or store applications of the retailer 22, and customer representatives of the retailer (i.e., sales associates) 23 over a plurality of network communication systems, such as via in-store kiosks, websites or store sales portals connected via the Internet, a local area network, a wide area network, etc. to one or more network servers of the retailer, as represented symbolically by ring 24. The embodiment of the system 10 illustrated in FIG. 1 can be executed on a hardware system 25, as illustrated in FIG. 2, which is described in more detail hereinbelow.

As illustrated in FIG. 1, the system 10 can include a catalog module 11, an envisioning module 12, a lead management module 13, a scheduling module 14, an ordering management module 15, a vendor management module 16, an account management module 17, an inventory management module 18, and/or an event management module 19. The catalog module 11 can include a catalog database 26 stored in a computer-readable memory that includes information relating to at least some of the purchasable items offered by the retailer. The term "purchasable items" as used herein is to be construed broadly to include all combination of products and materials that may be offered by a retailer, as well as any planning, design, installation, delivery, maintenance, cleaning, lawn care, removal and disposal of old products, pool services and/or warranty services offered by the retailer. The types of purchasable items will vary between the retailers. For example, according to an embodiment of the system 10 applicable to a home improvement retailer, the purchasable items can include without limitation furniture, appliances, flooring, decking, pools/whirlpool baths, lighting, countertops, millwork, door frames, window frames, doors, windows, paint, wall coverings, cabinetry, shelving, plumbing fixtures, lawn/garden supplies, etc., and planning, design, installation, delivery, maintenance, cleaning, lawn care, pool services and/or warranty services, etc. in connection with the foregoing.

According to one embodiment, the catalog database 26 includes textual information such as manufacturer/brand, price, model numbers, dimensions, features, functions, product reviews, warranty options and/or how-to applications. Further, the catalog database 26 can include graphical representations of the purchasable items, often in a number of different renderings (e.g., front, top, bottom, and/or side views). The purchasable items in the catalog database 26 can be items the retailer regularly stocks and/or special order items not typically stocked by the retailer, such as custom or other configurable items. Updates to the catalog database 26 preferably are under centralized management or control through a management system 28, such as the one illustrated in FIG. 2, which comprises part of the retailer's applications 22, to ensure that updates are correct and consistent before being distributed to the rest of the system 10.

The catalog module 11 can be configured to manipulate, search, sort, group and/or filter the data stored in the catalog database 26 and present the results to the customer 20 in a variety of different ways and/or formats. For instance, the catalog module 11 can be configured to provide search and sort capabilities allowing searches by manufacturer, brand, price, model number and/or product characteristics (e.g., color, size and performance characteristics).

The catalog module 11 can also group the data from the catalog database 26 into various categories based on end-user application. For example, according to one embodiment of the system 10 applicable to a home improvement retailer, the categories can include building materials, cabinetry, countertops, doors/windows, electrical, flooring, hardware, home appliances, home organization, kitchen/bath, lighting, lumber, millwork, multi-product, nursery, outdoor fashion, outside power equipment, paint, plumbing (fashion), plumbing (rough), tools, wall coverings, window treatments, lawn/garden, etc. According to another embodiment of the system 10 applicable to a consumer electronics retailer the categories can include audio equipment and accessories; computers and accessories; electronics (including home audio/video, televisions, home theater systems, DVD players, car audio/video, and accessories); entertainment furniture; home appliances; music; movies; games; office products; phones and communications; etc. Corresponding categories can also be configured for retailers in other industries, including, without limitation, household appliances, furniture, clothing, sporting equipment, toys and playground equipment, groceries, and motorized vehicles.

At each category level, the catalog module 11 will present information to the customer 20 that will assist the customer in making informed decisions regarding which purchasable items to select. For example, according to the embodiment of the system 10 applicable to a home improvement retailer, a customer 20 interested in countertops for kitchen cabinets would be informed of the features and benefits of each available countertop surface. For example, to facilitate ease of comparison, the customer 20 would be informed of the price, heat resistance qualities, durability, stain resistance, colors, etc. of each countertop surface, such as laminate, granite, solid surface, tile, and quartz. According to the embodiment of the system 10 applicable to a consumer electronics retailer, a customer 20 interested in a DVD player would be informed of the features and benefits of each available DVD model offered by the retailer, such as play back functionality, storage space, recording ability, inputs/outputs, warranty, etc. The catalog module 11 can be configured to compare the information presented for alternate purchasable items within a category, and generate a graphical output, such as a table, spread sheet, etc., illustrating the comparison to the customer 20.

Active links can also accompany the listings of purchasable items displayed by the catalog module 11 from the catalog database 26. For instance, purchasable items will often be linked to related, substitute, or alternative items and/or accessories. For example, according to the embodiment of the system 10 applicable to a home improvement retailer, tile can be linked with grout or tile alternatives or substitutes such as linoleum, or accessories such as tile tools (including a float or tile saw). According to the embodiment of the system 10 applicable to a consumer electronics retailer, the DVD players can be linked to movies, blank discs, connection cables and other home theater components. The catalog module 11 can also be configured to show the list of related, substitute and/or alternative items and/or accessories once a purchasable item has been selected.

Other links can be presented based upon customer preferences previously provided by the customer and stored in computer-readable memory by the system 10 (e.g., the lead management module 13); contemporaneously provided by the customer; or inferred based on actions by the customer 20, such as previous purchase habits or other attributes that are stored in computer-readable memory by the system 10 (e.g., the lead management module). The customer preferences can be used to filter or sort purchasable items displayed to the customer 20. For example, if the customer 20 is interested in only high or low price points, the catalog module 11 can sort or screen the selections based upon this customer preference. However, the customer 20 can still override the filter to see all of the items. The filtering or sorting of purchasable items based upon customer preferences is advantageous, since it not only allows the retailer to present the customer with a more focused and refined list of purchasable items to meet the customer's needs, but also provides the retailer with information corresponding to a number of important sales variables, including customer buying habits and preferences, brand preferences, etc., that the retailer can use to more effectively manage the retailer's inventory, marketing efforts, selection and placement/organization of purchasable items, etc.

The catalog module 11 is configured to present the purchasable items from the catalog database 26 to the customer 20. Once a purchasable item is selected, a sales module 32 is configured to advance the customer 20 through the purchase/sales process, such as soliciting any necessary customer contact information, including, without limitation, the customer's name, address, telephone number, electronic mail address, etc. and payment information. The sales module 32 can be a separate module in communication with the catalog module 11 and order management module 15 or can comprise part of the catalog module or order management module. The sales module 32 preferably is integrated with the in-store sales system 30 illustrated in FIG. 2, which comprises part of the retailer's applications 22. The in-store sales system 30 and system 10 preferably are under centralized management or control through the management system 28 to ensure that all tasks or steps in the sales process, as established by the retailer, are executed by the customer representatives 23 and/or the customer 20 for each sale of purchasable items and to ensure that any updates, modifications or changes to the tasks or steps performed during the sales process can be implemented throughout the entire system 10 at one time. The in-store sales system 30 and management system 28 preferably are configured to support a variety of functions including point-of-sale, delivery, inventory management, payment and invoicing, and customer account management.

The tasks involved in the purchase/sales process will vary according to the purchasable item or items selected by the customer 20, as well as how the customer accesses the system 10. In the event the customer 20 is at one of the retailer's stores, the sales module 32 is configured to request, receive, and process data representing the customer's selection of purchasable items through the in-store sales system 30 either with or without the assistance of a customer representative 23 and to communicate the data to the order management module 15, which is described in more detail below. In the event the customer 20 is connected to the system 10 via a computer network, such as the Internet, the sales module 32 is configured to request, receive, and process data representing the customer's selection of purchasable items and to communicate the data to the order management module 15.

For non-configurable purchasable items, the sales module 32 obtains the requisite customer information, such as the customer's address, payment information etc. and communicates data representing this information to the order management module 15. "Non-configurable purchasable items" are items that do not require the customer 20 to select or input any specifications for the items in order to purchase the items, whereas "configurable purchasable items" are items that require the customer 20 to select or input at least one specifications (i.e., color, size, finish, options, etc.) in order to purchase the items. For configurable purchasable, the catalog module 11 and/or the sales module 32 are configured to solicit from the customer 20 the requisite specifications necessary to configure the item. The configuration specifications will depend upon the type of purchasable item that is selected by the customer 20. For example, according to an embodiment of the system 10 applicable to a home improvement retailer, if the customer selects a door, the sales module 32 is configured to solicit from the customer specifications relating to size, finish, window treatments, etc.

While the system 10 is soliciting the specifications for the selected purchasable item, the catalog module 11 can be configured to access the catalog database 20 and to propose one or more related items to the customer 20. For example, if the selected purchasable item is a door, the catalog module 11 can propose hardware for the door or, if the purchasable item is a DVD player, the catalog module can propose connection cables or movies to the customer, or the catalog module can ask about additional related and/or unrelated purchasable items, including delivery, installation, maintenance, or warranty services, etc. The sales module 32 then obtains the requisite customer information, such as the customer's address, payment information, etc. and communicates data representing this information to the order management module 15.

As illustrated in FIG. 1, the envisioning module 12 is in communication with the catalog module 11 and is configured to request, receive, and process data from the catalog module representing the purchasable items selected by the customer 20. The catalog module 11 is configured to communicate data representing the selected purchasable items to the envisioning module 12, including, without limitation, dimensions, color, installation specifications, etc. The envisioning module 12 is also configured to solicit from the customer 20 and to request, receive, and process data representing the environment (referred to herein as the "environs") in which the customer expects to use the selected purchasable items. In another embodiment (not shown), the data representing the environment is solicited by the catalog module 11 and communicated to the envisioning module 12. The envisioning module 12 is further configured to generate and display on a monitor, in-store kiosk, or other device or hardware for displaying images a three-dimensional graphical representation of the environs and the selected purchasable items so that the customer 20 can visualize the selected purchasable items in the environs. In one embodiment, the envisioning module 12 is configured so that the customer 20 can modify the graphical representation, such as by zooming in/out, changing perspective, rotating and modifying viewing angle, etc.

According to one embodiment of the present invention, the envisioning module 12 is in communication with a project template database 34 stored in a computer-readable memory that includes information relating to at least one or more environs in which a customer 20 will commonly use at least some of the purchasable items offered by the retailer. In embodiments where the catalog module 11 solicits information regarding the environs, the catalog module is in communication with the project template database 34. The nature and specifications of the environs will depend upon the types of purchasable items offered by the retailer. For example, according to an embodiment of the system 10 applicable to a home improvement retailer, the project templates can include a kitchen, a bathroom, a room, or an exterior space. With or without the use of the project templates 34, the envisioning module 12 is configured to solicit, receive, and process specifications from the customer 20, including dimensions, color, etc. For example, if the environs is a kitchen, the customer 20 may be asked specific questions about cabinets, countertops, flooring, appliances, millwork (doors, windows, molding, etc.), décor (paint, wallpaper, window treatments, etc.), plumbing hardware, cabinet hardware and lighting. The envisioning module 12 preferably solicits information relating to the environs from the customer 20 by asking a series of scripted questions. Updates to the envisioning module 12 and project template database 34 preferably are under centralized management or control through the management system 28, such as the one illustrated in FIG. 2, which comprises part of the retailer's applications 22, to ensure that updates are correct and consistent before being distributed to the rest of the system 10.

The data received by the envisioning module 12 from the customer 20 may result in the envisioning module soliciting additional information from the customer, or may require the customer to change or modify previous information provided by the customer if a conflict is detected by the envisioning module. As data is received by the envisioning module 12 from the customer 20 and/or the catalog module 11, the envisioning module can generate and display a three-dimensional graphical representation of the environs and selected purchasable items, such as the one illustrated in FIG. 5.

In other embodiments of the system 10, the envisioning module 12 is configured to request, receive, process and store in computer-readable memory customer entries or notes relating to the environs and/or purchasable items, such as costs, version dates, etc. for later reference. The envisioning module 12 in communication with the catalog module 11 can also provide the customer with options for generating cost ranges. For example, according to an embodiment of the system 10 applicable to a home improvement retailer, if the customer wanted to obtain a price range on a full kitchen, the envisioning module 12 could solicit from the customer the size of the kitchen, quality of the cabinets (e.g., good, better, best), countertop material (roll, granite, solid surface, etc.), appliance quality. Based upon the data provided by the customer, the envisioning module 12 in communication with the catalog module 11 would generate a price range for the purchasable items. Conversely, the customer 20 could provide the envisioning module 12 with a price range and an estimated size of the kitchen, and the envisioning module in communication with the catalog module 11 would generate a list of potential purchasable items within this price range and propose this list to the customer. In one embodiment, the envisioning module 12 could propose a per category budget to the customer 20 based upon the customer's price range and estimated kitchen size and, once accepted by the customer, then generate a list of potential purchasable items in each category within this price range and propose these lists to the customer.

According to still other embodiments, the catalog module 11 and/or the envisioning module 12 can be configured to provide the customer 20 with a detailed parts list or lists for the purchasable items selected by the customer. For example, in one embodiment, the catalog module 11 and/or the envisioning module 12 can be configured to provide the customer with an exploded view of the purchasable item or items selected by the customer 20 along with a detailed parts list pertaining to the selected item or items.

The envisioning module 12 preferably is configured to provide multiple entry points so that the customer can exit the envisioning module and go to the catalog module 11 to select other purchasable items and then return to the envisioning module. For example, according to an embodiment of the system 10 applicable to a home improvement retailer, if the customer 20 initially starts with a simple kitchen appliance selection, but then decides to include cabinets and countertops, the envisioning module 12 in communication with the catalog module 11 will allow the customer to select the cabinets and countertops, which will then be incorporated into the graphical representation being generated by the envisioning module.

Once the envisioning module 12 receives data representing the environs defined by the customer 20 and data representing the purchasable items selected by the customer, the envisioning module will generate the three-dimensional graphical representation of the environs with the selected purchasable items. In one embodiment, the envisioning module 12 generates and outputs a graphical representation in two- or three-dimensional line-art form with a list of purchasable items necessary to complete the three-dimensional graphical representation. The line-art form is used to illustrate an outline of the project. In one embodiment of the system 10, as purchasable items are selected by the customer 20, the selected items are substituted for the line-art version in the graphical representation. Once the three-dimensional graphical representation is generated, the customer 20 can virtually walk through the environs and change or modify their selection of purchasable items as needed. As the customer 20 makes additional selections of purchasable items through the catalog module 11, the graphical depiction is regenerated by the envisioning module 12 to incorporate the new selections. For a simple product order, the envisioning module 12 may be bypassed allowing the customer 20 to access the catalog module 11 only.

The lead management module 13 is configured to request, receive, and process data representing sales variables, such as information relating to the purchasable items selected by customers, customer contact information (such as the customer's name, address, telephone number, facsimile number, and/or electronic mail address), the period of time between when the customer selected the purchasable item and when the customer finalized the purchase (the incubation period), whether the customer contacted a customer representative, whether the customer was contacted by a customer representative as a result of a prompt from the lead management module, whether the customer visited one of the retailer's stores, the number of times the customer engaged the system 10 (including through kiosk, Internet, etc.), and the duration of time between engagements, etc. In one embodiment, the lead management module 13 is configured to store sales variable data in computer-readable memory, such as in a customer information database (not shown), and to retrieve this information as needed.

The lead management module 13 preferably is configured to analyze the sales variables, such as by comparing, sorting, categorizing, and/or grouping the sales variables for two or more customers for one or more purchasable items, which analysis can be used to modify the timing for generating or initiating prompts to the customer representatives to contact customers for particular purchasable items; produce analytical reports for managers identifying patterns and trends; and/or determine buying trends for particular purchasable items. Advantageously, statistical analysis of the sales variables by the lead management module 13 allows the system 10 to identify patterns of customer behavior thereby allowing the system to be proactive in meeting customer 20 preferences and needs rather than reactive.

Since some customers 20 will utilize the catalog module 11 and/or the envisioning module 12 to investigate and contemplate various aspects of the selected purchasable items via kiosk, Internet, or in-store, such as options, cost, availability, etc., without finalizing the purchase, the lead management module 13 is also configured to generate or initiate a prompt for a customer representative 23 to contact the customer in order to answer any questions the customer may have regarding the selected purchasable items and/or other purchasable items offered by the retailer and to provide the customer with an opportunity to purchase these items. As used herein, a "prompt" can include, without limitation, an email or voicemail message, a pop-up task alarm or icon, or any other audible and/or visual reminder instructing the customer representative 23 to take certain action, such as contacting the customer 20, and/or identifying pertinent information for the customer representative, such as the purchasable items selected by the customer and the customer's contact information. In other cases, the customer 20 may purchase one purchasable item, but not a related item. For instance, when a customer 20 has paid for a detailed measuring service, but has not purchased the purchasable item for which the measurements are being obtained within a predetermined period of time, the lead management module 13 is configured to generate or initiate a prompt for a customer representative 23 to contact the customer. Thus, the lead management module 13 is configured to generate or initiate a prompt to the customer representative 23 at a predetermined time that is automatically scheduled by the lead management module based, at least in part, on the type of purchasable items selected by the customer.

According to another embodiment, the customer 20 will request to have a customer representative 23 contact the customer, which request is received by the lead management module 13 either directly or via the catalog module 11 or the envisioning module 12. Upon receipt of the customer's request, the lead management module 13 will generate or initiate a prompt to the customer representative 23 at a predetermined time, as specified in the customer's request, or that is automatically scheduled by the lead management module based, at least in part, on the type of purchasable items selected by the customer.

According to one embodiment of the system 10, as illustrated in FIG. 1, the lead management module 13 is in communication with the catalog module 11, the envisioning module 12, the scheduling module 14, and the event management module 19. Updates to the lead management module 13 preferably are under centralized management or control through the management system 28, such as the one illustrated in FIG. 2, which comprises part of the retailer's applications 22, to ensure that updates are correct and consistent before being distributed to the rest of the system 10. The lead management module 13 is configured to request, receive, and/or process sales variables. As used herein, "sales variables" include without limitation information such as data representing the customer's selection of purchasable items and the customer's contact information, from the catalog module 11 and/or the envisioning module 12. Alternatively, the lead management module 13 can be configured to solicit the customer's contact information from the customer 20. The lead management module 13 is further configured to request, receive, and/or process data representing other sales variables relating to customer contacts and existing orders from the order management module 15 via communication with the event management module 19 and/or the scheduling module 14. For prompts that require scheduling, the lead management module 13 communicates with the scheduling module 14, which schedules the prompt. At the scheduled time, the scheduling module 14 communicates the prompt to the lead management module 13, which then communicates the prompt to the customer representative 23.

The scheduling module 14 is configured to schedule various appointments, prompts, tasks, etc. for call-up and/or completion. According to one embodiment of the system 10, as illustrated in FIG. 1, the scheduling module 14 is in communication with the catalog module 11, envisioning module 12, the lead management module 13, the order management module 15, and the event management module 19 so that information provided by the customer 20 can be shared throughout the integrated system 10. Updates to the scheduling module 14 preferably are under centralized management or control through the management system 28, such as the one illustrated in FIG. 2, which comprises part of the retailer's applications 22, to ensure that updates are correct and consistent before being distributed to the rest of the system 10. In one embodiment, the catalog module 11, envisioning module 12, lead management module 13, and/or order management module 15 are configured to solicit from the customer the customer's selection of purchasable items, customer contact information, such as the customer's name, address, telephone number, facsimile number, and/or electronic mail address, which information can be communicated to the scheduling module 14 as necessary. The event management module 19 is configured to control the interaction between the various modules, as discussed more fully below. According to another embodiment, the scheduling module 14 is configured to solicit from the customer the customer's selection of purchasable items, customer contact information, such as the customer's name, address, telephone number, facsimile number, and/or electronic mail address.

According to one embodiment of the system 10, the scheduling module 14 is configured to request, receive, process, and store data representing a request by a customer 20 to schedule an appointment with a customer representative 23. The appointment can include either an in-store visit or an on-line dialog (such as a chat, etc.). The scheduling module 14 preferably is configured, either alone or in conjunction with the lead management module 13 and/or event management module 19, to allow the customer 20 to select the retailer's store at which the customer desires to schedule the appointment. In other embodiments, the scheduling module 14 also can be configured, either alone or in conjunction with the lead management module 13 and/or event management module 19, to allow the customer 20 to request a schedule of classes or seminars at a particular store or a schedule of on-line courses or broadcasts. The schedules can include all the offers by the retailer or can be limited to particular topics of interest, date, instructor, etc. Based at least in part upon the store and purchasable items selected by the customer 20, the scheduling module 14, either alone or in conjunction with the lead management module 13 and/or the event management module 19, is configured to identify customer representatives 23 at the selected store with knowledge of the selected purchasable items. The scheduling module 14 and/or lead management module 13 are further configured to propose to the customer 20 one or more available time frames or slots for the identified customer representatives 23 for an in-store visit or on-line chat. The scheduling module 14 and/or lead management module 13 are configured to request, receive, process, and store in computer-readable memory data representing the time frames or slots selected by the customer 20 and to communicate this information to the corresponding customer representative 23.

According to one embodiment, the scheduling module 14 is configured to request, receive, process, and store in computer-readable memory data representing available time frames or slots for one or more customer representatives 23 of the retailer, which can be periodically updated by the customer representative. For example, the scheduling module 14 can be configured to provide each customer representative 23 with a calendar on which the customer representative can identify available time frames or slots and on which the customer representative can store data representing scheduled appointments with customers 20 and notes relating to each appointment, such as the customer's name, customer contact information, purchasable items selected by the customer and information relating thereto. According to one embodiment, the scheduling module 14, either alone or in conjunction with the lead management module 13 and/or the event management module 19, is configured to prompt the customer representatives 23 to contact the customer 20, such as via electronic mail or telephone, prior to an appointment to obtain verification of the appointment. According to another embodiment, the scheduling module 14, either alone or in conjunction with the lead management module 13 and/or the event management module 19, is configured to prompt the customer representative 23 to accept the appointment prior to scheduling the appointment or otherwise confirming the appointment to the customer 20. According to yet another embodiment, the scheduling module 14, either alone or in conjunction with the lead management module 13 and/or the event management module 19, is configured to solicit from the customer 20 a preferred communication media, such as telephone or electronic mail, prior to scheduling an appointment. In the event appointments need to be changed for any reason, the customer representative 23 can contact the customer via their selected communication media.

According to another embodiment of the present invention, the scheduling module 14, either alone or in conjunction with the catalog module 11, the lead management module 13 and/or the event management module 19, is configured to provide the customer 20 with a detailed overview of the tasks involved in purchasing the purchasable items selected by the customer and/or a list of related purchasable items. For example, according to an embodiment of the present invention applicable to a home improvement retailer, if the customer 20 selects kitchen cabinets, the scheduling module 14, either alone or in conjunction with the lead management module 13 and/or the event management module 19, can be configured to provide the customer with a time range for each task involved in the purchase, such as vendor ordering, shipping, and installation. The time ranges can be presented to the customer 20 in a variety of formats, including a process map or flow chart, etc. Advantageously, the detailed overview of tasks allows the retailer to manage the customer's expectations by showing the total time investment needed to complete the purchase and obtain the selected purchasable items. The detailed overview preferably is accessible by not only the customer, but also the corresponding vendors 21 and customer representatives 23. According to one embodiment, as discussed more fully below, the event management module 19 is configured to generate the detailed overview of the tasks involved in purchasing the purchasable items selected by the customer 20 and the time ranges between each task and to communicate data representing this information to the scheduling module 14 to be stored in computer-readable memory. The event management module 19 preferable monitors for changes in the detailed overview due to customer or vendor modifications or delays, etc., and communicates with the scheduling module 14 to ensure that the detailed overview remains accurate when accessed by the customer 20, vendors 21, or customer representatives 23.

The scheduling module 14, either alone or in conjunction with the catalog module 11, the lead management module 13 and/or the event management module 19, can also be configured to provide the customer 20 with a list of related products that may be necessary to complete the project. For example, if the customer 20 selects kitchen cabinets, the scheduling module 14, either alone or in conjunction with the catalog module 11, the lead management module 13 and/or the event management module 19, can propose cabinets, countertops, hardware, sink and faucets.

According to another embodiment of the system 10, where the purchaser selects and orders purchasable items comprising services, such as detailed measuring, delivery, installation, maintenance, and/or warranty services, the scheduling module 14, either alone or in conjunction with the lead management module 13, the order management module 15, the event management module 19, and/or the vendor management module 16 (via the order management module and/or the event management module), can be configured to allow the customer 20 to schedule available time frames or slots for the retailer or a vendor 21 to perform the selected services. As discussed above, the scheduling module 14 preferably is in communication with the catalog module 11, order management module 15, the event management module 19 and the vendor management module 16 (via the order management module and/or the event management module), so that the detailed overview of tasks and the time ranges between each task can be regularly updated to incorporate any changes or modifications.

As illustrated in FIG. 1, the order management module 15 is in communication with the sales module 32. The order management module 15 is configured to request, receive, and process data relating to each order, including, without limitation, customer contact information and/or information relating to the purchasable items ordered by the customer 20. The order management module 15 is also in communication with the scheduling module 14, as described above, and the vendor management module 16 and the event management module 19, both of which are described in greater detail below. Updates to the order management module 15 preferably are under centralized management or control through the management system 28, such as the one illustrated in FIG. 2, which comprises part of the retailer's applications 22, to ensure that updates are correct and consistent before being distributed to the rest of the system 10.

Generally, the order management module 15 is configured to manage the orders it receives from the sales module 32. The order management module 15 is preferably configured to use industry standard communication mechanisms such as electronic data interchange (EDI) and extensible markup language (XML) to communicate orders to vendors 21 via the network 24 (either alone or through the vender management module 16). The order management module 15 can also be configured to request, receive, process and store in computer-readable memory status updates from the vendors 21 via the network 24 (either alone or through the vender management module 16) and present them to interested parties such as the customer 20, vendors and/or customer representatives 23. Preferably, the order management module 15 (either alone or in communication with the scheduling module 14) is in communication with the in-store sales system 30 and management system 28 so that the customer 20, vendors 21 and customer representatives 23 can access the system 10 and determine the status of an order from any of the retailer's stores. In addition, customers 20, vendors 21 and customer representatives 23 preferably can access the order management module 15 via the network 24, such as accessing the order management module via the retailer's web site through the Internet. In addition, the order management module 15 can be configured automatically to notify the customers 20, vendors 21, and/or customer representatives 23 and other interested parties by electronic mail, telephone, facsimile, etc. For example, in one embodiment, the order management module 15 comprises voice technology with logical interface scheduling options or interactive voice response, such as Edify, and can be configured to contact the customer 20 via telephone to notify them of the status of their order.

The event management module 19 is configured to monitor and control the interaction of the various modules 11-18 within the system 10 and to monitor the status of ongoing tasks relating to customer orders, prompts for customer follow-up, etc. As illustrated in FIG. 1, the event management module 19 is in communication with the lead management module 13, the scheduling module 14, the order management module 15 and the vendor management module 16, as well as the catalog module 11 and the envisioning module 12 through the lead management module and/or the scheduling module, and the account management module 17 and the inventory management module 18 through the order management module and/or the vendor management module. The event management module 19 and/or the vendor management module 16 can comprise separate modules in communication with the order management module 15 or can comprise part of the order management module. Updates to the event management module 19 preferably are under centralized management or control through the management system 28, such as the one illustrated in FIG. 2, which comprises part of the retailer's applications 22, to ensure that updates are correct.

According to the embodiment illustrated in FIG. 1, and as discussed briefly above, the event management module 19 is configured to request, receive, and process data representing orders from the order management module 15 and to generate or develop a detailed overview comprising order relationships or tasks for each order. As used herein, "order relationships or tasks" include relationships between the purchasable items ordered by the customer 20, such as the detailed measurement, delivery and/or installation services for tangible purchasable items, and include an execution hierarchy establishing the order of completion for each relationship or task, which can include time ranges for completion or actual completion dates. For example, in one embodiment, the event management module 19 receives data representing an order of a purchasable item from the order management module 15, generates an order relationship between the delivery and installation of the purchasable items, establishes an execution hierarchy between the delivery and installation, including computing delivery and installation dates. Preferably, the event management module 19 is configured to communicate the execution hierarchy to the customers 20, vendors 21, and/or customer representatives 23 and other interested parties by electronic mail, telephone, facsimile, etc. For example, in one embodiment, the event management module 19 comprises voice technology with logical interface scheduling options or interactive voice response, such as Edify, and can be configured to contact the customer 20 via telephone to notify them of the proposed delivery and installation dates. As discussed above, in one embodiment the event management module 19 communicates data representing the detailed overview to the scheduling module 14 to be stored in computer-readable memory, which can be accessed by the customer 20, vendors 21, and customer representatives 23.

Once the detailed overview (i.e., the order relationships and execution hierarchy) has been established, the event management module 19 is configured to monitor the progress of the execution hierarchy to completion and to make appropriate changes/modifications, as necessary. The event management module 19 is configured to request, receive, process, and store in computer-readable memory data representing changes or impacts to an upstream order component, such as a notice from a vendor 21 of an order delay, and to automatically check the changes or impacts against the downstream components to see if changes to the detailed overview are required. If changes are determined to be necessary, the event management module 19 is configured to communicate the changes to the order management module 15 and/or scheduling module 14, which in turn communicates the changes to the customers 20, vendors 21, and/or customer representatives 23 and other interested parties by electronic mail, telephone, facsimile, etc. In one embodiment, the event management module 19 is configured to capture and store in computer-readable memory data representing all customer contacts the scheduling module 14, the order management module 15, and the event management module have, for example, by communicating the data to the lead management module 13 to be stored as a sales variable.

Changes to the detailed overview by the event management module 19 can be accomplished in several ways. In one embodiment, the event management module 19 recognizes a change in some aspect of the detailed overview and prompts a customer representative 23 to make the necessary changes. In another embodiment, the event management module 19 recognizes a change in some aspect of the detailed overview and automatically initiates the appropriate changes based upon predetermined rules. In yet another embodiment, the event management module 19 recognizes a change in some aspect of the detailed overview and automatically initiates the appropriate changes based upon previous occurrences of similar events, i.e., by learning.

As illustrated in FIG. 1, the vendor management module 16 is in communication with the order management module 15 and the event management module 19. As indicated above, the event management module 19 and/or the vendor management module 16 can comprise separate modules in communication with the order management module 15 or can comprise part of the order management module. Updates to the vendor management module 16 preferably are under centralized management or control through the management system 28, such as the one illustrated in FIG. 2, which comprises part of the retailer's applications 22, to ensure that updates are correct.

The vendor management module 16 is configured to request and receive, and "vendor data," to store the data in computer-readable memory, and to process or analyze the data, such as by comparing, sorting, categorizing, and/or grouping the data for two or more vendors for one or more purchasable items, so as to ensure the quality of the purchasable items for the customers 20. "Vendor data" can include information relating to vendor performance, such as the number of shipments completed on time, quality of the purchasable items provided by the vendor, percentage of complete shipments, as well as information from on-site inspections and customer surveys, including, without limitation, information relating to whether the vendor was courteous, quality of workmanship, professional appearance, etc. "Vendor data" can also include contact information (phone numbers, facsimile numbers, electronic mail, etc.), crew size, certifications, insurance, storage capabilities (for holding large orders prior to installation), availability for assignment, coverage area, references, etc. For example, in one embodiment the vendor management module 16 is configured to initiate an application to each prospective vendor 21 soliciting the desired contact information and is configured to receive, process and store in computer-readable memory data representing the vendor's response to the application. The vendor management module 16 preferably requires entry of contact and other information by the vendors via the application in order to participate in the system 10. Upon completion of the application, the application information is communicated by the vendor management module 16 to various personnel of the retailer for verification of credentials and consideration of placement on a certified list maintained by the vendor management module. The prospective vendors are not added to the certified list unless the vendor management module 16 receives the appropriate authorization to do so.

Upon placement of vendors 21 on the certified list, the vendor management module 16 provides each of the vendors an opportunity to participate in projects that the vendor management module determines to be in their coverage area and for which the suppliers are available. In this regard, the vendor management module 16 is configured to request, receive, and process data representing orders from the order management module 15, either alone or in communication with the event management module 19 and/or the scheduling module 14 (via the order management module and/or the event management module). The vendor management module 16 is also configured to request, receive, process and store in computer readable memory data from the vendor 21 representing the completion of tasks identified in the detailed overview by the event management module.

According to another embodiment, the vendor management module 16 (either alone or in communication with the order management module 15 and/or event management module 19) is configured to communicate and/or administer an on-site inspection and/or customer survey to the customer 20 upon the occurrence of a trigger, such as completion of a task by a vendor 21. For example, the on-site inspections and/or customer surveys can be designed to measure such factors in vendor performance as promptness, appearance, courteousness and/or professionalism. The vendor management module 16 can also be configured to analyze the results of the on-site inspection and/or customer survey, such as by scoring the results of the surveys and inspection to determine which vendors 21 can remain on the certified list.

While the vendor management module 16 can be configured to allow the customer 20 or the customer representative 23 to select the vendor 21 to provide a particular purchasable items, such as measurement, delivery, installation, maintenance, or warranty services, etc., in one embodiment, the vendor management module selects the vendor for the customer automatically based upon a predetermined vendor schedule or rotation, so that each vendor has an equal opportunity of being selected. Advantageously, by using an objective method to select vendors, the vendor management module 16 eliminates many of the biases that may reside in the customer representatives 23, which makes the system 10 more attractive to potential vendors.

According to yet another embodiment of the present invention, the vendor management module 16 is configured to request, receive, and process data representing updates to the vendor's catalogs and to communicate the updated information to the envisioning module 12 and/or the catalog module 11. Preferably, the updates to the catalog module 11 and/or the envisioning module 12 are performed automatically upon receipt of the updates from the vendors 21. In another embodiment of the system 10, the updates to the catalog module 11 and/or the envisioning module 12 are received by the catalog module and/or envisioning module directly from the vendor.

As illustrated in FIG. 1, the system preferably includes an account management module 17 in communication with the sales module 32, order management module 15, and vendor management module 16, as well as the event management module 19 through the order management module and/or vendor management module. The account management module 17 preferably is configured to request, receive, process, and store in computer-readable memory data representing certain financial information relating to individual transactions of the retailer, including payments from customers 20 and invoices from vendors 21. In one embodiment, the account management module 17 is configured to request, receive, and process data from the sales module 32 relating to orders and customer payment information, such as credit card nos., debit card no., etc., and to process the payments. In another embodiment, the account management module 17 is configured to request and receive invoices from vendors 21 and to process the invoices and issue payments to the vendors electronically. Updates to the account management module 17 preferably are under centralized management or control through the management system 28, such as the one illustrated in FIG. 2, which comprises part of the retailer's applications 22, to ensure that updates are correct.

Referring to FIG. 1, the system 10 can also include an inventory management module 18 in communication with the order management module 15, the vendor management module 16 and the account management module 17, as well as the event management module 19 through the order management module and/or vendor management module. The inventory management module 18 is configured to monitor and manage the inventory of the retailer by capturing and storing in computer-readable memory data representing the quantity of purchasable items sold and restocked. In one embodiment, the inventory management module 18, either alone or in communication with the vendor management module 16, is configured to communicate automatically with the vendor in the event the quantity of specified purchasable items falls below a preset minimum requesting the vendor to restock the purchasable items.

According to another embodiment of the system 10, if the retailer does not have a purchasable item selected by a customer 20 in stock at the retailer's store nearest the customer, the inventory management module 18, in communication with the order management module 15 and/or the event management module 19, is configured to communicate with one or more of the retailer's other stores or distribution facilities to determine whether the purchasable item is in stock at these stores or facilities and, if so, whether the item can be delivered to customer or to the retailer's store nearest the customer in a period of time acceptable to the customer. If the purchasable items is not in stock one or more of the retailer's other stores or distribution facilities or cannot be delivered to the customer 20 or to the retailer's store nearest the customer in a period of time acceptable to the customer, then the inventory management module 16, either alone or in communication with the vendor management module 16, is configured to communicate automatically with the vendor 21 to obtain the purchasable item.

Referring to FIG. 2, there is illustrated the infrastructure of a hardware system 25 comprising a management system 28 and an in-store system 30, according to one embodiment of the present invention, for implementing the system 10 characterized by centralized processing and decentralized execution. The architecture of the in-store system 30 can include one or more point-of-sale (POS) terminals 50, one or more client terminals 51, a wide-area-network (WAN) communications router system 52, and an in-store server complex 53. The management system 28 can include a corporate server farm 54, a host system 55 and an information warehouse system 56.

According to one embodiment of the present invention, the system 10 is browser-centric (i.e., web based) and uses the Java 2 enterprise edition (J2EE) server model to promote centralized control of many of the system's processes. According to this embodiment, the POS terminals 50 and client terminals 51 can be relatively thin client end points running browser software that are connected via an in-store wired and wireless local area network (LAN) 57 to the WAN communications system 52 and in-store server complex 53. The WAN communications system 52 can use a variety of high-speed communications mechanisms, such as frame relay, asynchronous transfer mode ("ATM"), multi-protocol label switching ("MPLS"), communicating via TCP/IP communications or satellite.

Preferably, the one or more modules of the system 10 primarily reside on the components of the management system 28 so as to have centralized control, provide sharing of information and data between stores and on-line access, and minimize in-store hardware requirements. However, some or all of the applications could be run locally, such as the in-store system 30 and perhaps portions of the catalog database 26 which can reside on the in-store server complex 53. In particular, the product images can reside locally to facilitate quick access by the various terminals 50, 51 or in-store kiosks (not shown). Where the system 10 comprises two or more of the modules described above, the modules are preferably interconnected via a message-oriented infrastructure. In this manner, each of the modules can be modified or replaced without having undue effect on the other modules.

It should be noted that the customer 20 can also access the system 10 using their own local terminals, such as over the Internet with a home computer. In this case, the system 10 has the capability of using automated dialing, electronic mail, and on-line chats to interact with the customer 20 regarding purchasable items of interest to the customer. Vendors 21 can also interact with system 10 via EDI transactions, XML or through a vendor-specific web site, or through electronic mail updates. Customer representatives 23 can interact with the system 10 using the terminals 50, 51 that provide a common launch point for the various modules while also providing a common source for all alerts and messages generated by the modules. It should be noted that the above-described architecture embodiment is not meant to be limiting as other combinations of hardware, software and firmware may be employed to implement the system 10 of the present invention as will be described below.

Referring to FIG. 3, there is illustrated a method of using the present invention applicable to a home improvement retailer. Use of the system of the present invention varies based upon the complexity of the home improvement project, the perspective of the user and other factors. However, generally the customer first connects to the system, such as via the Internet or an in-store kiosk. See Block 60. Once connected to the system, the customer interacts with the catalog and/or envisioning modules to select a purchasable item or items. See Block 61. For instance, the customer may select kitchen remodeling and then answer a list of detailed questions generated from a kitchen remodeling project template. Alternatively, the customer wishing a more high-level estimate may consult the envisioning module and specify a size of the kitchen, quality of various materials and appliances to obtain a high-level quote. The selection of purchasable items could also focus on obtaining options available within certain price ranges.

As the broad outlines of the home improvement project are selected, the envisioning module generates a graphical display of the selected purchasable items in the environs defined by the customer. See Block 64. Also, the scheduling module identifies the customer representative with expertise in the selected purchasable items, and proposes a plurality of time slots with the representative. See Block 63. The customer then schedules the appointments by selecting the appropriate time slots. In the case of schedule selection via the Internet, the scheduling module withholds finalization of scheduling pending notification of a person-to-person telephone call with the customer.

Preferably, the envisioning module, or another module, has received and stored in computer-readable memory customer contact information. If any of the envisioning, scheduling, or other steps are interrupted and a sale is not completed, the customer information and selected purchasable items are transmitted to the lead management module. See Block 62. The lead management module then identifies the need for a lead and sends a reminder with the lead information to one of the customer representatives. The customer representative can then follow up with the customer and inquire about the customer's plans, answer any questions the customer may have, and attempt to persuade the customer to complete their order.

Once the broad outlines of the home improvement project have been selected, the customer elects to identify specific purchasable items by consulting the catalog module. See Block 65. The customer can manipulate listed purchasable items by sorting the items based on desired characteristics. For configurable purchasable items, once the desired item or items are identified, the customer defines the specification and/or final attributes of the configurable item. See Block 66. Upon completion of this process, and after any other changes to item selections, the envisioning module obtains data on the changes and regenerates the graphical depiction of the home improvement project. See Block 68.

As each purchasable item is selected in the catalog module, the customer can select accessories and related items that are displayed by the catalog module, which items, if selected, are then added to the overall order. See Block 67. During each selection, the catalog module and/or envisioning module in conjunction with the catalog module continuously updates a list of purchasable items and other materials needed to complete the home improvement project. Once the purchasable items have been selected, the order management module, in communication with the vendor management module and the event management module, identifies a list of potential installation service vendors from a group of previously certified vendors having a service area encompassing the project and having time availability to perform the project. The vendor management module then selects the vendor from the list of certified vendors. See Block 69.

Once the order is completed, a list of the ordered purchasable items, along with other associated details, are distributed to the various vendors by the order management module. See Block 71. The order management module also can make the order details available to other interested parties, such as the customer or customer representative. The order is communicated to the event management module that identifies relationships between the purchasable items and vendors and uses these relationships to build an execution hierarchy. See Block 72.

Portions of the execution hierarchy are then distributed to various vendors that provide required services, such as detailed measurement, delivery, and/or installation, etc., so as to coordinate execution of the home improvement project. Further, the event management module captures and stores in computer-readable memory data representing modifications and/or changes sent by the customer or vendors and then, in turn, modifies the execution hierarchy, including accounting for downstream changes. See Block 73. Once some, or all, aspects of the project have been completed, the vendor management module conducts customer surveys and receives, processes and stores in computer-readable memory the results of on-site inspections. See Block 74. According to another embodiment, the vendor management module prompts a customer representative to conduct a customer survey and on-site inspection, the results of which are received, processed and stored in computer-readable memory. This information is then used by the vendor management module to rank the vendors for maintenance of the certification list.

A system 70 of another embodiment of the present invention is shown in FIG. 4. The system 70 includes a processor 75 that communicates with other elements within the system via a system interface or bus 76. Also included in the system 10 is one or more display device/input devices 77 for receiving and displaying data. The display device/input device may be, for example, a keypad or pointing device that is used in combination with a display screen. The system 70 further includes memory 78, which preferably includes both read only memory (ROM) 90 and random access memory (RAM) 70. The ROM 90 is used to store a basic input/output system (BIOS) 91, containing the basic routines that help to transfer information between elements within the system 70.

In addition, the system 70 includes at least one storage device 92, such as a hard disk drive, a floppy disk drive, a CD-ROM drive, or optical disk drive, for storing information on various computer-readable media, such as a hard disk, a removable magnetic disk, or a CD-ROM disk. As will be appreciated by one of ordinary skill in the art, each of these storage devices 92 is connected to the system bus 76 by an appropriate interface. The storage devices 92 and their associated computer-readable media provide non-volatile storage for the system 70. It is important to note that the computer-readable media described above could be replaced by any other type of computer-readable media known in the art. Such media include, for example, magnetic cassettes, flash memory cards, digital video disks, and Bernoulli cartridges.

One or more program modules can be stored by the various storage devices, such as within RAM 79 (as illustrated in FIG. 4) or within the storage device 92. Such program modules can include an operating system 80, a catalog module 81, an envisioning module 82, a lead management module 83, a scheduling module 84, an order management module 85, a vendor management module 86, an account management module 87, an inventory management module 88 and/or an event management module 89. The modules control certain aspects of the operation of the system 70, as is described above, with the assistance of the processor 75 and the operating system 80. While described as separate modules, these functions may, instead, be integrated.

Also located within the system 70, is a system interface 93 for interfacing and communicating with other elements of the retailer's applications 22, such as the management system 28 and in-store system 30 illustrated in FIG. 2. It will be appreciated by one of ordinary skill in the art that one or more of the components of the system 10, 70 can be located geographically remotely from other system components. Furthermore, one or more of the components may be combined, and additional components performing functions described herein may be included in the system.

According to one embodiment, the system 10 can include optical or magnetic wireless scanners (not shown) that the customer can use in-store to select purchasable items. These customer selections are received and processed by the catalog module 11 and stored in computer-readable memory for later reference by the customer 20. If the customer desires, the customer may check-out after making the desired selections of purchasable items, including tendering payment therefor. At check-out, the customer's selection of purchasable items is communicated to the order management system 15 by the catalog module 11 and/or sales module 32. The order management module 15, either alone or in communication with the scheduling module 14, vendor management module 16, and/or the event management module 19, will then prompt a customer representative 23 to pull the purchasable items selected by the customer 20 and arrange to have the items delivered to the customer. In one embodiment, the customer 20 identifies a desired delivery time and date at the time of check-out, which delivery time and date can be communicated by the order management module 15 to the schedule module 14 and stored in computer-readable memory.

FIGS. 1, 2, 3, and 4 are block diagrams, flowcharts and control flow illustrations of methods, systems and program products according to the invention. It will be understood that each block or step of the block diagrams, flowcharts and control flow illustrations, and combinations of blocks in the block diagrams, flowcharts and control flow illustrations, can be implemented by computer program instructions. These computer program instructions may be loaded onto, or otherwise executable by, a computer or other programmable apparatus to produce a machine, such that the instructions which execute on the computer or other programmable apparatus create means or devices for implementing the functions specified in the block diagrams, flowcharts or control flow block(s) or step(s). These computer program instructions may also be stored in a computer-readable memory that can direct a computer or other programmable apparatus to function in a particular manner, such that the instructions stored in the computer-readable memory produce an article of manufacture, including instruction means or devices which implement the functions specified in the block diagrams, flowcharts or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagrams, flowcharts or control flow block(s) or step(s).

Accordingly, blocks or steps of the block diagrams, flowcharts or control flow illustrations support combinations of means or devices for performing the specified functions, combinations of steps for performing the specified functions and program instruction means or devices for performing the specified functions. It will also be understood that each block or step of the block diagrams, flowcharts or control flow illustrations, and combinations of blocks or steps in the block diagrams, flowcharts or control flow illustrations, can be implemented by special purpose hardware-based computer systems which perform the specified functions or steps, or combinations of special purpose hardware and computer instructions.

Overall, the system 10, 70 overcomes the difficulties encountered in the prior art by providing an at least partially integrated solution wherein the customer 20 can design, select, order, purchase, and monitor the customer's project and coordinate services for the completion of the project. For purposes of example only and not limitation, several of the benefits of the system 10, 70 are set forth hereinbelow. The envisioning module 12 allows the customer 20 to visualize the selected purchasable items in an environs defined by the customer as it is developed from an initial, rough design, all the way through to the actual selection of specific goods with specific characteristics. The lead management module 13 facilitates the sale of purchasable items by tracking customer contacts with the system 10, 70 and periodically providing lead information to customer representatives 23 for follow-up with the customer 20. The scheduling module 14 allows the customer 20 to obtain additional help on design and/or selection of purchasable items, as well as allowing the retailer to manage the customer's expectations for completion of the various tasks involved with order, delivery and/or installation of the selected purchasable items. The order management module 15 manages the logistics associated with each order and apprises the various interested parties of the status of the order. The vendor management module 16 ensures that only quality vendors are involved in the process, thereby overcoming the customer's lack of knowledge of the trustworthiness and skill of the vendors. The event management module 19 monitors and coordinates the completion of the execution hierarchy of the selected purchasable items to ensure timely completion and preferably controls all prompts, etc. relating thereto.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for facilitating the management of sales opportunities for purchasable items offered to customers, the system comprising:
a processing element capable of proposing a plurality of purchasable items to a plurality of customers for selection by the customers, said processing element being capable of receiving and storing data representing at least one purchasable item selected by each customer and data representing at least one sales variable for each customer, and wherein said processing element is further capable of comparing the at least one sales variable for at least two customers.

2. A system according to claim 1 wherein the purchasable items comprise products selected from the group consisting of furniture, appliances, flooring, decking, lighting, countertops, millwork, doorframes, window frames, doors, windows, paint, wall coverings, cabinetry, and shelving.

3. A system according to claim 1 wherein the purchasable items comprise services selected from the group consisting of design services, measuring services, installation services, maintenance services and warranty services.

4. A system according to claim 1 wherein the data representing at least one sales variable for each customer comprises data representing customer buying habits.

5. A system according to claim 1 wherein the data representing at least one sales variable for each customer comprises data representing customer buying preferences.

6. A system according to claim 1 wherein the data representing at least one sales variable for each customer comprises data representing customer brand preferences.

7. A system according to claim 1 wherein the data representing at least one sales variable for each customer comprises data indicative of effective management of inventory of purchasable items.

8. A system according to claim 1 wherein the data representing at least one sales variable for each customer comprises data indicative of effective management of marketing efforts regarding the purchasable items.

9. A system according to claim 1 wherein the data representing at least one sales variable for each customer comprises data indicative of effective management of selection of purchasable items to be offered to customers.

10. A system according to claim 1 wherein the data representing at least one sales variable for each customer comprises data indicative of effective management of retail placement of purchasable items offered to customers.

11. A system according to claim 1 wherein the data representing at least one sales variable for each customer comprises data indicative of effective management of retail organization of purchasable items offered to customers.

12. A computer program product for facilitating the management of sales opportunities for purchasable items offered to customers, computer program product comprising a computer-readable storage medium having computer-readable program code portions stored therein, the computer-readable program portions comprising:
an executable portion for proposing a plurality of purchasable items to a plurality of customers for selection by the customers, said executable portion capable of receiving data representing at least one purchasable item selected by each customer and data representing at least one sales variable for each customer, and wherein said executable portion capable of comparing the at least one sales variable for at least two customers.

13. A computer program product according to claim 12 wherein the purchasable items comprise products selected from the group consisting of furniture, appliances, flooring, decking, lighting, countertops, millwork, doorframes, window frames, doors, windows, paint, wall coverings, cabinetry, and shelving.

14. A computer program product according to claim 12 wherein the purchasable items comprise services selected from the group consisting of design services, measuring services, installation services, maintenance services and warranty services.

15. A computer program product according to claim 12 wherein the data representing at least one sales variable for each customer comprises data representing customer buying habits.

16. A computer program product according to claim 12 wherein the data representing at least one sales variable for each customer comprises data representing customer buying preferences.

17. A computer program product according to claim 12 wherein the data representing at least one sales variable for each customer comprises data representing customer brand preferences.

18. A computer program product according to claim 12 wherein the data representing at least one sales variable for each customer comprises data indicative of effective management of inventory of purchasable items.

19. A computer program product according to claim 12 wherein the data representing at least one sales variable for each customer comprises data indicative of effective management of marketing efforts regarding the purchasable items.

20. A computer program product according to claim 12 wherein the data representing at least one sales variable for each customer comprises data indicative of effective management of selection of purchasable items to be offered to customers.

21. A computer program product according to claim 12 wherein the data representing at least one sales variable for each customer comprises data indicative of effective management of retail placement of purchasable items offered to customers.

22. A computer program product according to claim 12 wherein the data representing at least one sales variable for each customer comprises data indicative of effective management of retail organization of purchasable items offered to customers.

23. A method for facilitating the management of sales opportunities for purchasable items offered to customers, the method comprising:
proposing a plurality of purchasable items to a plurality of customers for selection by the customers;
receiving electronically data representing at least one purchasable item selected by each customer and data representing at least one sales variable for each customer;
storing electronically data representing at least one purchasable item selected by each customer and data representing at least one sales variable for each customer; and
comparing the at least one sales variable for at least two customers.

24. A method according to claim 23 wherein the purchasable items comprise products selected from the group consisting of furniture, appliances, flooring, decking, lighting, countertops, millwork, doorframes, window frames, doors, windows, paint, wall coverings, cabinetry, and shelving.

25. A method according to claim 23 wherein the purchasable items comprise services selected from the group consisting of design services, measuring services, installation services, maintenance services and warranty services.

26. A method according to claim 23 wherein the data representing at least one sales variable for each customer comprises data representing customer buying habits.

27. A method according to claim 23 wherein the data representing at least one sales variable for each customer comprises data representing customer buying preferences.

28. A method according to claim 23 wherein the data representing at least one sales variable for each customer comprises data representing customer brand preferences.

29. A method according to claim 23 wherein the data representing at least one sales variable for each customer comprises data indicative of effective management of inventory of purchasable items.

30. A method according to claim 23 wherein the data representing at least one sales variable for each customer comprises data indicative of effective management of marketing efforts regarding the purchasable items.

31. A method according to claim 23 wherein the data representing at least one sales variable for each customer comprises data indicative of effective management of selection of purchasable items to be offered to customers.

32. A method according to claim 23 wherein the data representing at least one sales variable for each customer comprises data indicative of effective management of retail placement of purchasable items offered to customers.

33. A method according to claim 23 wherein the data representing at least one sales variable for each customer comprises data indicative of effective management of retail organization of purchasable items offered to customers.

* * * * *